United States Patent [19]
Yeo et al.

[11] Patent Number: 6,058,086
[45] Date of Patent: May 2, 2000

[54] METHOD AND APPARATUS FOR TESTING QUALITY OF AN OPTICAL DISK MEDIUM

[75] Inventors: Woon-Seong Yeo; Hyung-Kyu Kim, both of Cheong-ju; Dong-Seok Bae, Buchun, all of Rep. of Korea

[73] Assignee: LG Electronics, Inc., Seoul, Rep. of Korea

[21] Appl. No.: 09/118,059

[22] Filed: Jul. 17, 1998

Related U.S. Application Data

[63] Continuation-in-part of application No. 08/989,660, Dec. 12, 1997.

[60] Provisional application No. 60/074,340, Feb. 6, 1998.

[30] Foreign Application Priority Data

Dec. 19, 1996 [KR] Rep. of Korea ................... 682821996

[51] Int. Cl.[7] ............................................. G11B 7/02
[52] U.S. Cl. ................. 369/58; 369/54; 369/47; 369/59
[58] Field of Search ................... 369/58, 54, 47, 369/48, 49, 59, 13, 53, 32

[56] References Cited

U.S. PATENT DOCUMENTS

| | | |
|---|---|---|
| 5,256,965 | 10/1993 | Nomura . |
| 5,502,702 | 3/1996 | Nakajo ..................................... 369/58 |
| 5,530,687 | 6/1996 | Yamaguchi . |
| 5,559,785 | 9/1996 | Honda et al. .......................... 369/54 X |
| 5,821,004 | 10/1998 | Hino et al. ............................ 369/13 X |
| 5,872,763 | 2/1999 | Osakabe ................................ 369/54 X |

*Primary Examiner*—Muhammad Edun

[57] ABSTRACT

The method and apparatus for testing the quality of an optical disk medium moves an optical disk into a testing position (e.g. disposes the optical disk in a disk drive), and records test data in the outer area of an optical disk. This outer area of the optical disk is not used when manufacturing a prerecorded disk, and is also not used by users of write-once optical disks. The quality of the optical disk is judged based on the test signal produced from reproducing the test data in the outer area of the optical disk. Based on the judged quality, the optical disk is classified for further processing.

35 Claims, 22 Drawing Sheets

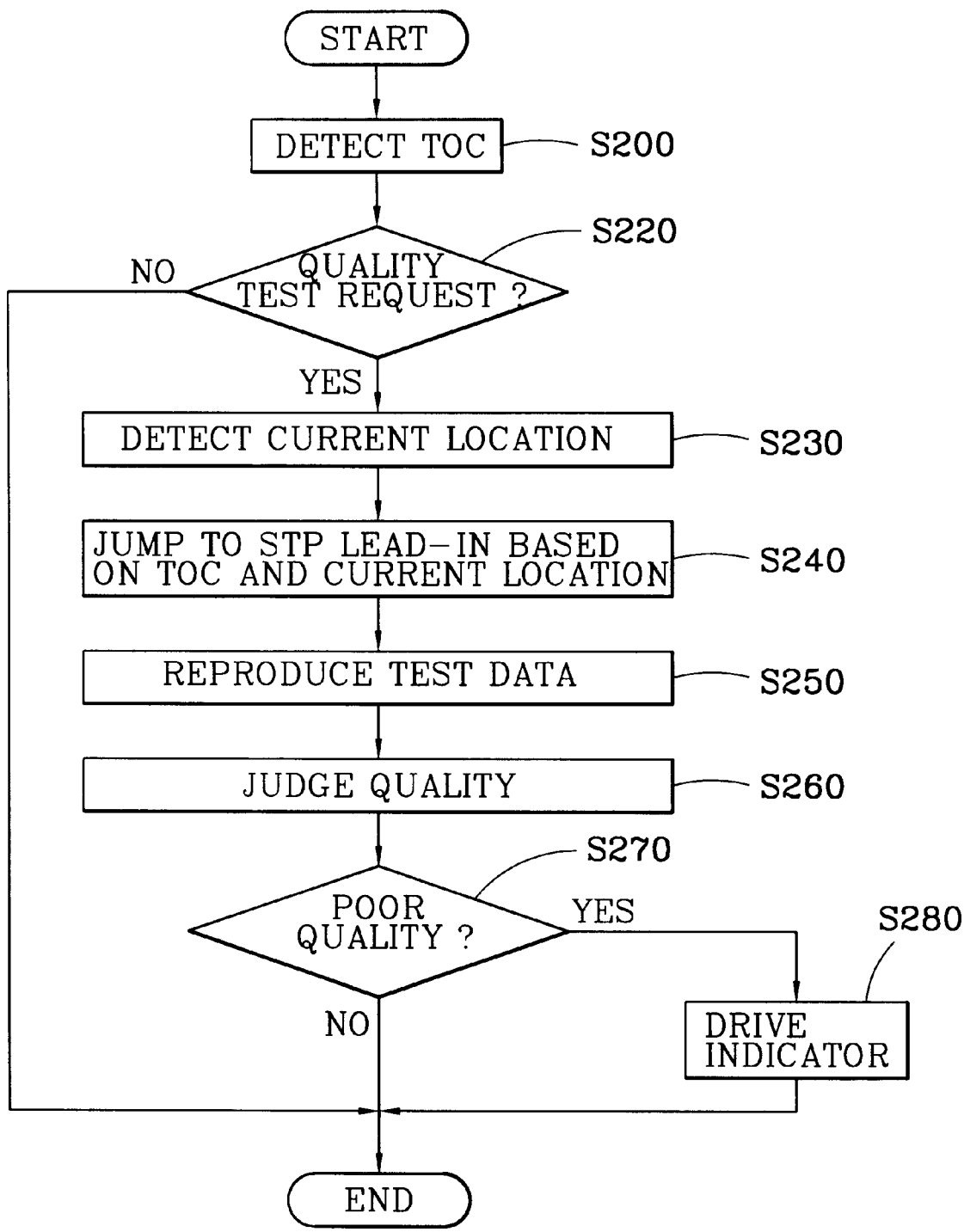

FIG. 18

| DECIMAL SYSTEM | BINARY SYSTEM | EFM TRANSFORMATION | NUMBER OF 3T SIGNAL |
|---|---|---|---|
| 0 | 00000000 | 010010001000000 | 1 |
| 1 | 00000001 | 010010001000000 | 1 |
| 2 | 00000010 | 010010001000000 | 1 |
| ... | ... | ... | ... |
| 242 | 11110010 | 100100010010010 | 4 |
| ... | ... | ... | ... |
| 255 | 11111111 | 001000000010010 | 1 |

METHOD AND APPARATUS FOR TESTING QUALITY OF AN OPTICAL DISK MEDIUM

This is a continuation-in-part of Application No. 08/989,660 filed on Dec. 12, 1997, the entire contents of which are hereby incorporated by reference. This application claims priority of Provisional Application No. 60/074,340 filed Feb. 6, 1998 for "Optical Disk Quality Method and Apparatus" by YEO et al.

BACKGROUND OF THE INVENTION

1. Field of the Invention

The present invention relates to an optical disk quality inspection apparatus, and more particularly, to an improved apparatus and method for optical disk quality inspection capable of effectively inspecting disk quality during the disk fabrication process.

2. Description of Related Art

Disk media are divided into two groups, magnetic disks and optical disks such as compact disks (CDs). Because of their large storage capacity, the demand for optical disks has rapidly increased. Optical disks are classified into a pre-recorded disk such as a compact disk (CD), a write-once disk such as CD-R (CD-recordable), and a rewritable disk medium such as CD-RW and DVD-RAM.

FIGS. 1A and 1B illustrate conventional optical disks. The radius L1 of these disks is 60 mm, while the diameter L2 of the center hole is 15 mm. FIG. 1A illustrates a conventional prerecorded optical disk. As shown in FIG. 1A, a recording area of the optical disk includes a lead-in start point BLI, a main storage area start point BPL, and a lead-out start point BLO. Information is written in the main storage area MSA between the main storage area start point BPL and lead-out start point BLO.

FIG. 1B illustrates a conventional write-once optical disk upon which no information has been recorded. As with the optical disk of FIG. 1A, the optical disk of FIG. 1B has a recording area, and when information is recorded thereon, this information is recorded in a main storage area MSA. As shown in both FIGS. 1A and 1B, an outer area of the recording area is not used to store information. This provides a margin of error with respect to manufacturing defects since defects in the recording area are much more likely to occur in the outer area of the recording area due to the manufacturing techniques used.

FIGS. 2A and 2B are schematic views illustrating the architecture of a CD-R disk.

Initially, a CD-R disk is injection-molded using a stamper to form a pre-grooved polycarbonate substrate. Then, a spin coating process is applied to the fabrication of the pre-grooved polycarbonate substrate.

As shown in FIG. 2A, the spin coating process allows the pre-grooved polycarbonate substrate to rotate at about 3000 rpm so as to carry out a disk coating process, wherein a coating liquid is dropped inward the disk so as to be spread out in accordance with its centrifugal force.

The recording layer is initially formed using polyvinyl and the spin coating process, and a reflection layer and a protection layer are sequentially formed using aluminum on the recording layer. A coating layer is formed using UV resin on the protection layer, and then finally a labeling layer is formed to thereby obtain a CD-R disk having a cross-section as shown in FIG. 2B. The protection-coated CD-R disk is stacked on a spindle and transferred to a quality inspection apparatus.

As illustrated in FIG. 2A, when the spin coating process is used in optical disk fabrication, the thickness of the disk tends to be gradually thinner toward its outer periphery. As a result, when recording on or playing back from a recording layer of the disk, the occurrence of errors becomes higher toward the outer circumference because of a non-uniformity of a record layer, so that, conventionally, target information is recorded only on a main storage area which accounts for 118 mm out of the entire 120 mm diameter of an optical disk. The outer area beyond the boundary of 118 mm is not employed for recording.

The conventional disk quality inspection methods at large vary from a visual inspection method to a reflection rate inspection method.

FIG. 3 is a block diagram of a visual inspection apparatus manufactured by the Koch Company. As shown therein, the visual inspection apparatus includes a controller 10 for carrying out an overall control operation of the inspection apparatus, drives 11–14 for executing a recording/playingback operation of a test signal on/from a lead-in area of a main storage area, a test signal processing unit 15 for analyzing attributes of test signals played back from the drives 11–14, a measurement system 15 for comparing a reference signal to respective attributes analyzed from the test signal processing unit 15 and determining whether the disk quality is poor.

At this time, it is assumed that the disk is injection-molded using the identical stamper, and four drives are normally adopted with a slight difference depending upon the manufacturer of the measurement apparatus.

The test signal processing unit 15 includes a central processing unit 15a, and digital signal processing units 15b–15e which respectively correspond to the drives 11–14.

Here, DSP1–DSP4 (15b–15e) respectively serve to analyze attributes from test signals played back. The DSP-1 (15b) analyzes a servo signal and a focusing signal, the DSP-2 (15-C) analyzes jitter, DSP3 (15d) analyzes a mechanical attribute, and DSP4 (153) analyzes an optical attribute.

The thusly constituted disk visual inspection apparatus will now be described.

When disk fabrication is completed, disks sampled according to the control of the controller 10 are appropriately mounted in the drives 11–14, and the respective drives 11–14 record/play back the test signals on/from the lead-in area or the main storage area in accordance with the control of the controller 10.

The DSP1–DSP4 15a–15e correspondingly receive the test signals played back from the drives 11–14, and then according to the control of the CPU 15a, analyze a high frequency HF, a jitter, a servo signal, a focusing signal, a mechanical characteristic and an optical characteristic. At this time, the measurement factors include optical characteristics such as double refraction, reflectivity, and permeability, and signal attributes such as error occurrence per block, radical noise and jitter, which are respectively employed to evaluate the disks.

Consequently, the measurement system 16 compares a previously stored reference signal with high frequency, jitter, servo signal, focusing signal, mechanical attribute and optical attribute so as to determine whether the disk quality is poor.

As discussed above, conventional quality test methods involve recording signals in the lead-in area or main storage area of the disks, reproducing those test signals, and comparing the test signals to reference signals to determine quality.

Unfortunately, however, these methods cannot be applied to every optical disk manufactured. For instance, once test data is written into a write-once optical disk, that disk loses its value as a commercial good because it becomes unusable. Accordingly, samples from a plurality of manufactured optical disks are taken and tested according to the above-described methodology.

Besides rendering the sampled disks unusable, these quality testing techniques also prove to be inaccurate and unreliable. Just because the sampled disks may be of sufficient quality does not necessarily mean that the other disks, not sampled, are of sufficiently high quality. Therefore, these tests tend to be inaccurate and unreliable.

Furthermore, in the conventional reflectivity inspection method, the light coming out from a laser diode is branched into a plurality of beams and beamed on the disks. The plurality of beams reflected from the reflection layer of the disk are detected using a plurality of optical detectors, and defects, resulting from a non-uniformity of layers which occur during molding or fabrication (e.g., a sputtering process and a spin coating process), are detected. The accuracy of defect judgement for reflectivity inspection depends on the number of optical detectors and the size thereof.

Currently available technology experiences a limitation in decreasing the size of optical detectors such that only noticeable detects, not fine detects, can be detected.

Optical disk media also undergo additional quality tests. For instance, the entire surface of the optical disk is displayed by monitoring the scanning of the optical disk surface with a laser beam using a CCD camera. The surface is then visually checked using the display.

Other tests include push/pull, crosstalk, and checking the location of the lead-in start point BLI, main storage area start point BPL, and lead-out start point BLO.

Through the above described test process, mechanical characteristic measurements such as the lead-in start point BLI, the main storage area start point BPL, the lead-out start point BLO, a track and index start point, a test speed, a track pitch, a bow deflection, a warp deflection, a thickness of the optical disk, an angular deflection, a vertical deflection, the radius of the optical disk, and the diameter of the center hole of the optical disk are checked. In addition, signal characteristics such as radial noise, focal noise, push/pull of a tracking signal, data carrier analog, and carrier digital are checked.

SUMMARY OF THE INVENTION

The method and apparatus for testing the quality of an optical disk medium according to the present invention moves an optical disk into a testing position (e.g. disposes the optical disk in a disk drive), and records test data in the outer area of the optical disk. This outer area of the optical disk is not used when manufacturing a prerecorded disk, and is also not used by users of write-once optical disks. The quality of the optical disk is judged based on the test signal produced from reproducing the test data in the outer area of the optical disk. Based on the judged quality, the optical disk is classified for further processing.

BRIEF DESCRIPTION OF THE DRAWINGS

The present invention will become more fully understood from the detailed description given hereinbelow and the accompanying drawings which are given by way of illustration only, wherein like reference numerals designate corresponding parts in the various drawings, and wherein:

FIG. 9 illustrates a flow chart of the method for testing the quality of an optical disk according to the present invention;

FIG. 18 is a table of an ASCII code system;

DETAILED DESCRIPTION OF THE PREFERRED EMBODIMENTS

FIRST EMBODIMENT OF AN OPTICAL DISK QUALITY TEST APPARATUS

Figure 6:
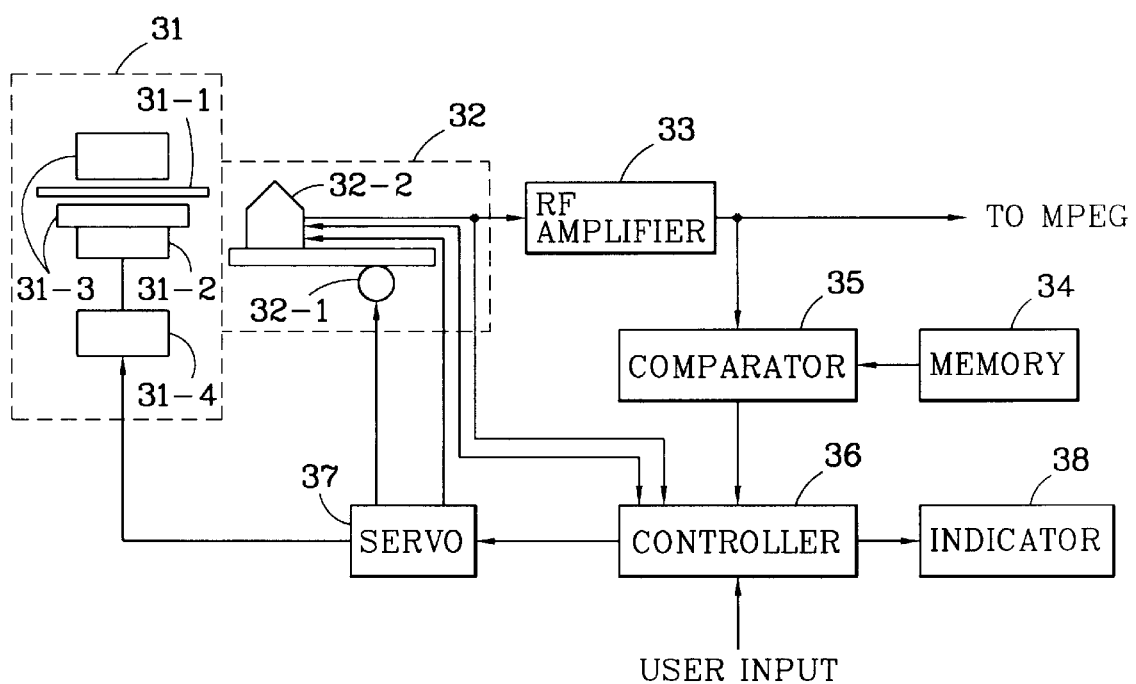
FIG. 6 is a block diagram of an embodiment of an apparatus for recording test data in an optical disk and for testing optical disk quality according to the present invention.

FIG. 6 illustrates an embodiment of an apparatus for recording test data on an optical disk and for testing the quality of an optical disk according to the present invention (hereinafter "the optical disk quality test apparatus"). As shown, the optical disk quality test apparatus includes a drive unit 31 and a pick-up unit 32. The drive unit 31 includes a tray 31-2 for supporting an optical disk 31-1 to be played, a clamp 31-3 for clamping the optical disk 31-1, and a spindle motor 31-4 for rotating the optical disk 31-1. The pick-up unit 32 includes a pick-up 32-2 for writing information on and reading information from the optical disk 31-1. A slide motor 32-1 moves the pick-up 32-2 radially with respect to the optical disk 31-1.

A controller 36 controls the operation of the spindle motor 31-4 and the slide motor 32-1 via a servo 37 based on user input and focus error and tracking error signals from the pick-up unit 32. When instructed by a user to record test data on the optical disk 31-1, the controller 36 supplies the test data to be written onto the optical disk 31-1 to the pick-up unit 32, and controls the recording of the test data.

When instructed by a user to perform a quality test on the optical disk 31-1, the controller 36 controls the pick-up unit 32 to reproduce the test data recorded on the optical disk 31-1. The reproduced signal output by the pick-up unit 32 is supplied to an RF amplifier 33 and the controller 36, while the focus error and tracking error signals are supplied to the controller 36. Based on the focus error and tracking error signals and the reproduced signal, the controller 36 controls the slide motor 32-1 and the spindle motor 31-4 via the servo 37. The RF amplifier 33 processes the reproduced signal from the pick-up unit 32 and outputs the processed reproduced signal for MPEG processing. The processed reproduced signal is also supplied to a comparator 35.

The comparator 35 compares the processed reproduced signal with predetermined data stored by a memory 34. The results of the comparison are output to the controller 36 which determines, based on the comparison results, whether the optical disk 31-1 is of good or poor quality. If the controller 36 determines that the optical disk 31-1 is of poor quality, the controller 36 drives an indicator 38 to indicate the poor quality of the optical disk 31-1 to a user.

OPERATION OF FIRST EMBODIMENT OF OPTICAL DISK QUALITY TEST APPARATUS

Figure 1A:
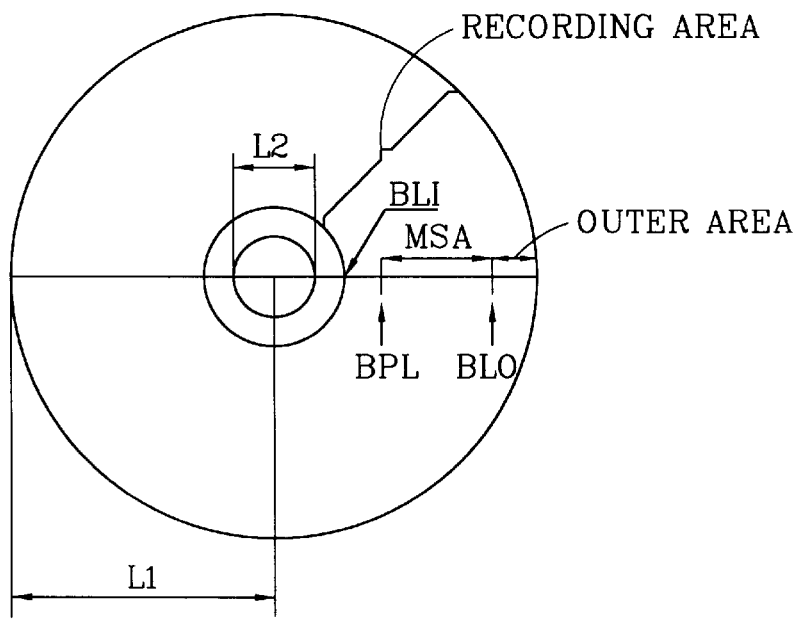
FIGS. 1A and 1B illustrate conventional optical disks.
Figure 1B:
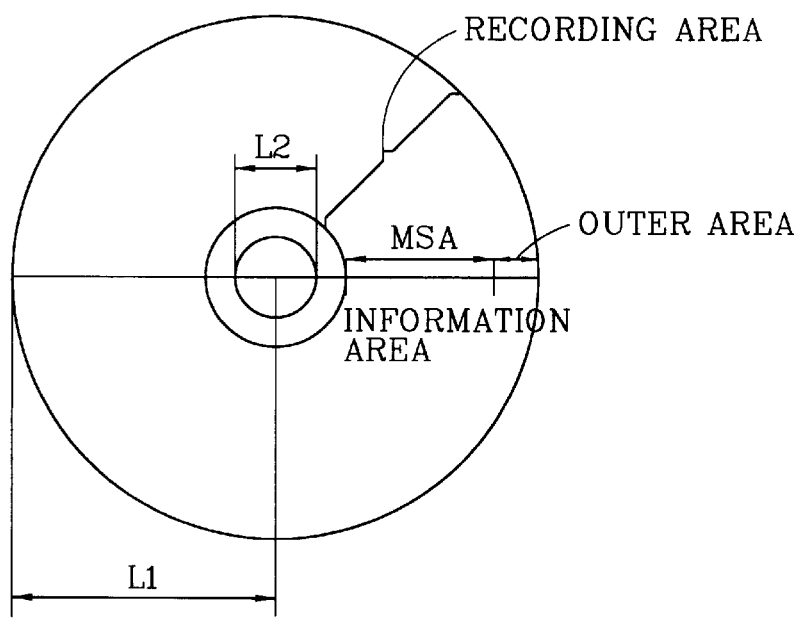
Figure 2A:
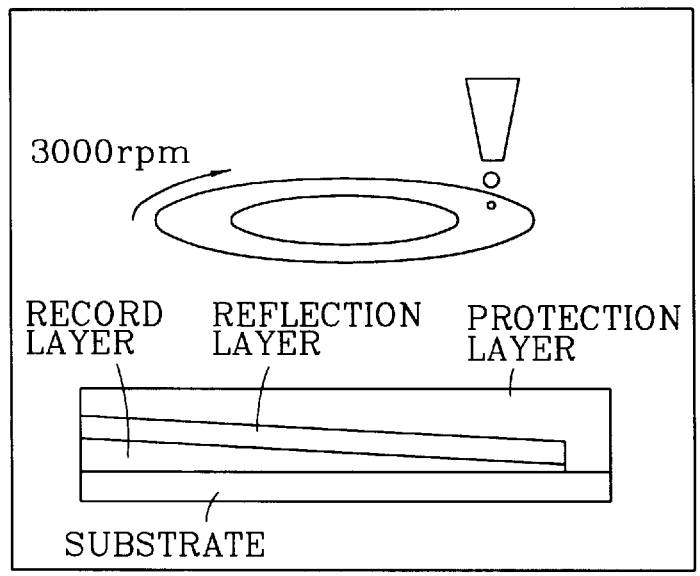
FIG. 2A is a composition view with regard to the fabrication of a CD-R disk using a spin coating process.
Figure 2B:
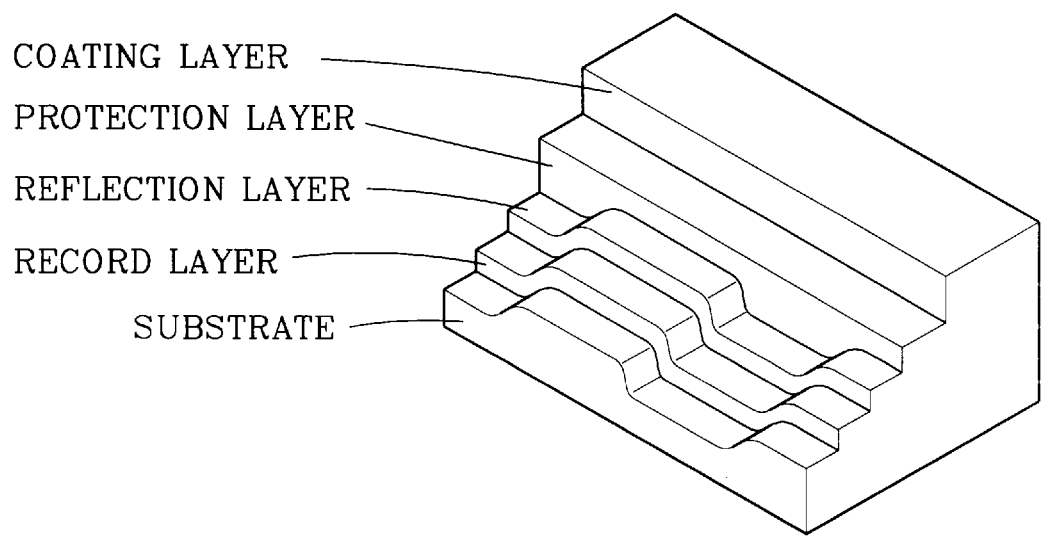
FIG. 2B is a partially sectioned perspective view of a CD-R disk fabricated using the spin coating process.
Figure 3:
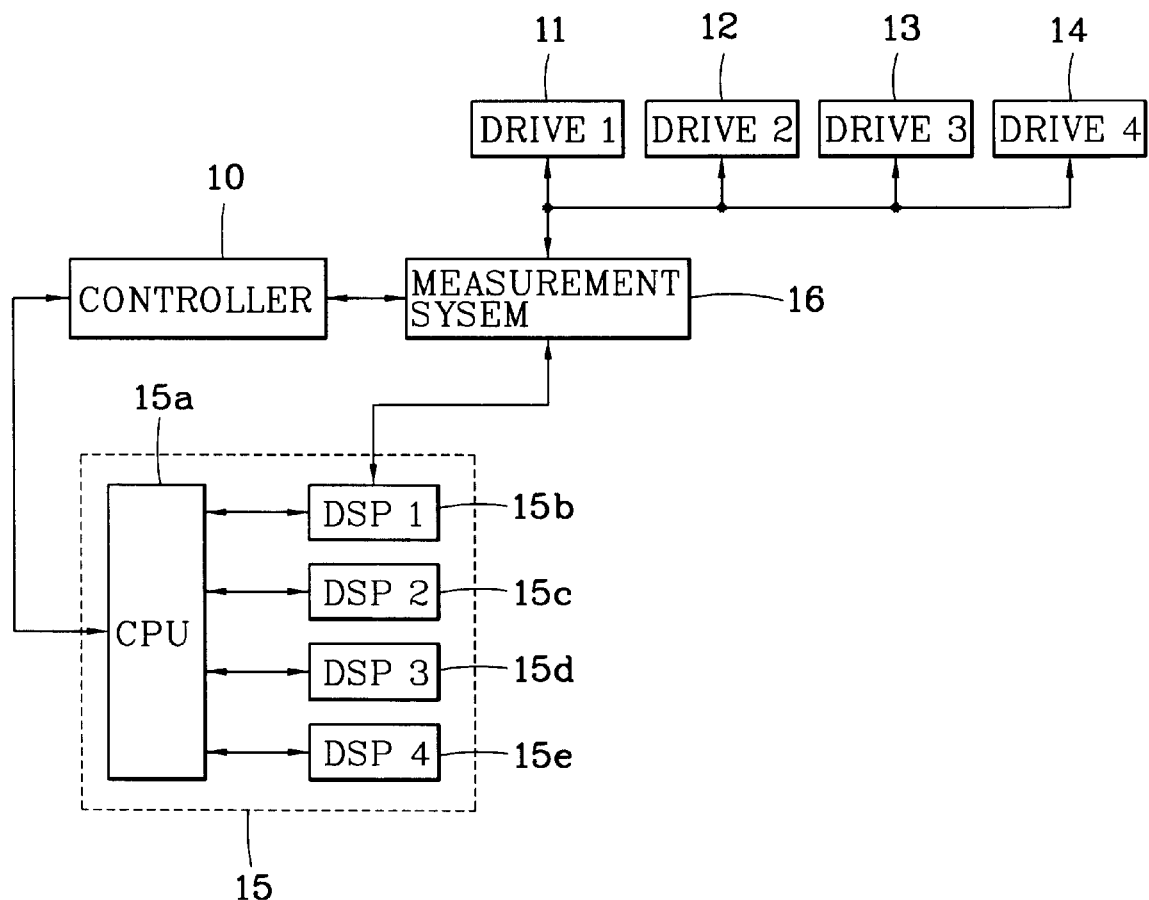
FIG. 3 is a block diagram of a visual inspection apparatus manufactured by the Koch Company.
Figure 4A:
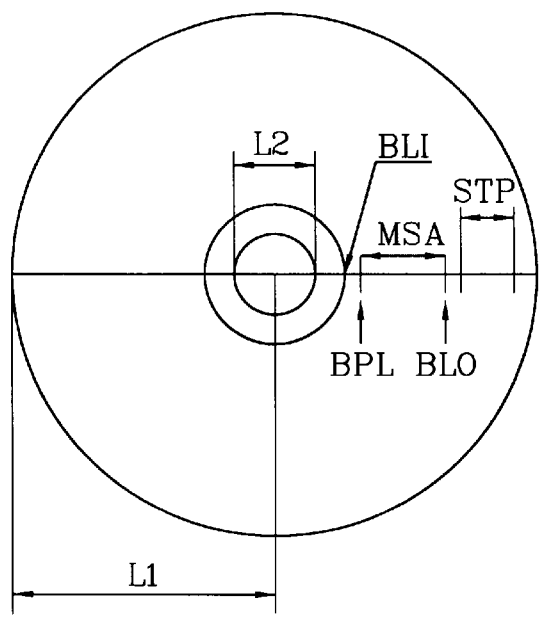
FIGS. 4A and 4B illustrate optical disks according to the present invention.
Figure 4B:
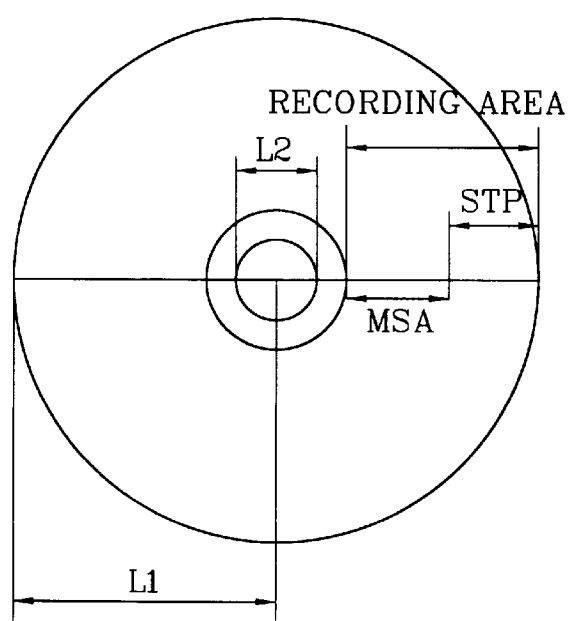

The operation of the optical disk quality test apparatus according to the present invention will be described in detail with respect to FIGS. 4A–9. As shown in FIGS. 4A and 4B, the optical disk quality test apparatus according to the present invention records test data STP in the outer area of an optical disk; both prerecorded (FIG. 4A) and write-once (FIG. 4B) optical disks. This recording operation will be discussed in more detail below with respect to FIGS. 6–8B.

Method of Recording Test Data

Figure 7:
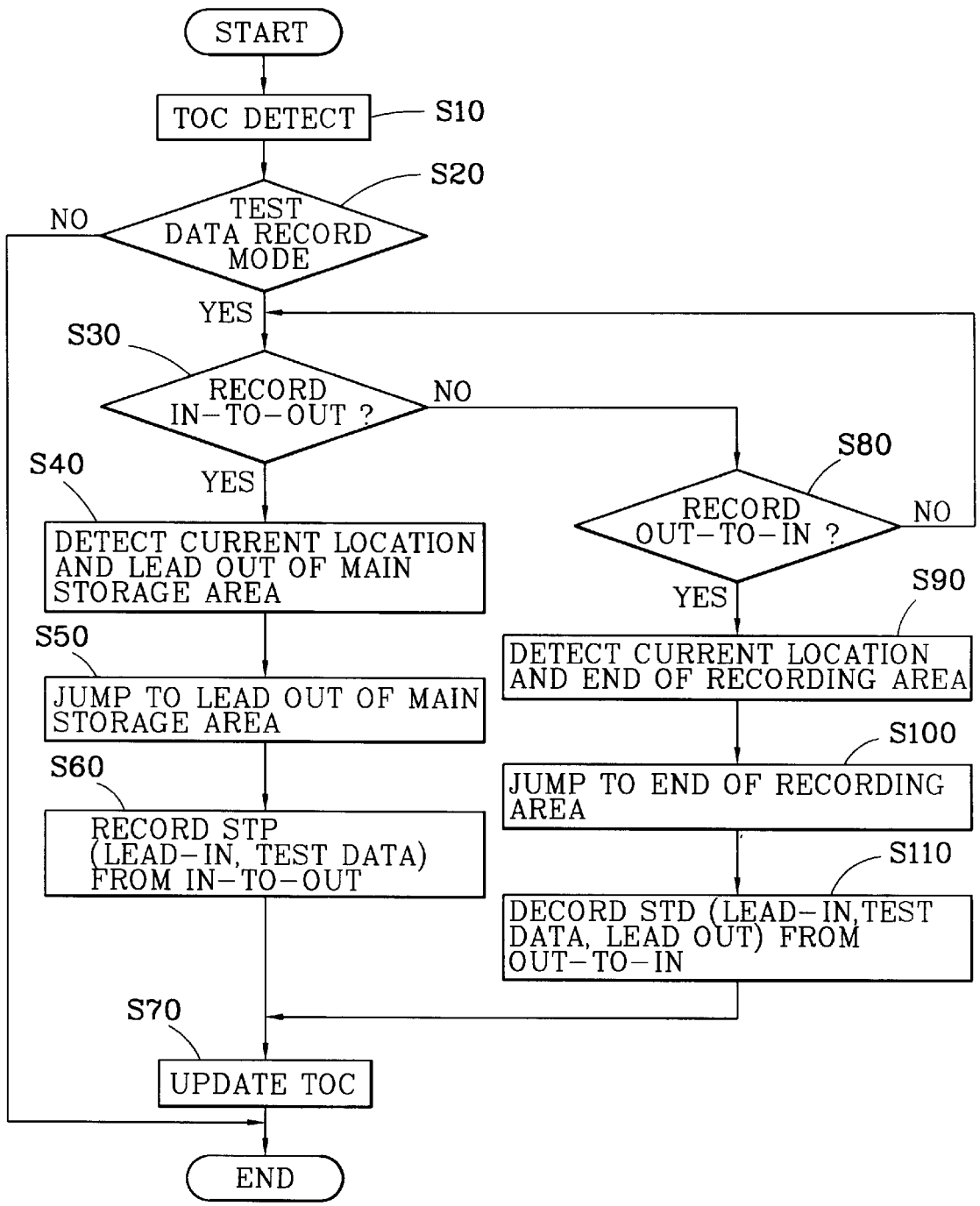
FIG. 7 is a flow chart of a method for recording test data in an optical disk according to the present invention.

FIG. 7 illustrates a flow chart of the method for recording test data in an optical disk according to the present invention. As shown, in step S10, the controller 36 causes the optical pick-up unit 32 to read the Table Of Contents TOC data from the optical disk. The TOC data, recorded near the center of optical disks, indicates the position of, for instance, the lead-in start point for the main storage area, the main storage area, and the lead-out start point for the main storage area in a prerecorded optical disk. For purposes of discussion only, the method of recording test data in an optical disk will be described with respect to a prerecorded optical disk. One skilled in the art, however, will readily appreciate the application of this method to a, for example, write-once optical disk.

After receiving the TOC data from the pick-up unit 32, the controller 36 determines whether a user has selected a test data record mode in step S20. If the test data record mode has not been selected, processing ends. Otherwise, in step S30, the controller 36 determines whether a user has selected an in-to-out recording mode.

If the in-to-out recording mode has been selected in step S30, then in step S40, the controller 36 determines the current location of the pick-up 32-2 in any well known manner, and determines the location of the lead-out start point BLO for the main storage area based on the TOC data. Then, in step S50, the controller 36 moves the pick-up 32-2 to the lead-out of the main storage area based on the detected current location of the pick-up 32-2 and the determined location of the lead-out start point BLO of the main storage area.

Figure 8A:
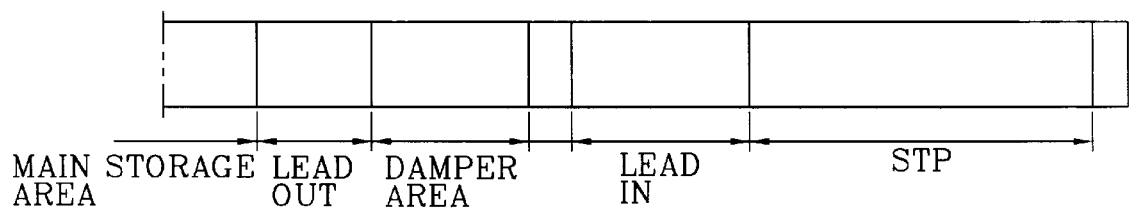
FIGS. 8A and 8B illustrate an information state of the optical disks when test data is written therein according to the present invention.

In step S60, the controller 36 causes the pick-up unit 32 to record test data STP in the optical disk 31-1 in an in-to-out fashion as shown in FIG. 8A. The test data can be supplied by a user or can be predetermined data stored by the controller 36. The test data can be a predetermined pit pattern, a predetermined bit pattern, or a predetermined signal such as a known musical composition. The test data will be described in more detail below with respect to testing the quality of an optical disk.

The controller 36, as shown in FIG. 8A, controls the pick-up 32-2 to record a lead-in to the test data and the test data while tracking the optical disk and moving from a radially inward position to a radially outward position. In other words, the controller 36 moves the pick-up 32-2 via the slide motor 32-1 and the servo 37 in a radially outward direction of the optical disk during recording of the test data. Additionally, as shown in FIG. 8A, the controller 36 causes the pick-up unit 32 to begin recording the lead-in area for the test data STP a predetermined radial distance after the lead-out area of the main storage area to create a damper area between the lead-out of the main storage area and the lead-in of the test data STP.

After recording of the test data is complete, the controller 36 in step S70 updates the TOC data in the optical disk to indicate the location of the test data and the lead-in therefor.

If in step S30 the in-to-out recording mode is not selected, then in step S80, the controller 36 determines whether the out-to-in recording mode has been selected by a user. If the out-to-in recording mode has not been selected, processing returns to step S30. Otherwise, processing proceeds to step S90. In step S90, the controller 36 detects the current location of the pick-up 32-2 in any well known manner, and determines the location of the end of the recording area from the TOC data. Then in step S100 the controller 36 moves the pick-up 32-2 to the end of the recording area.

Figure 8B:
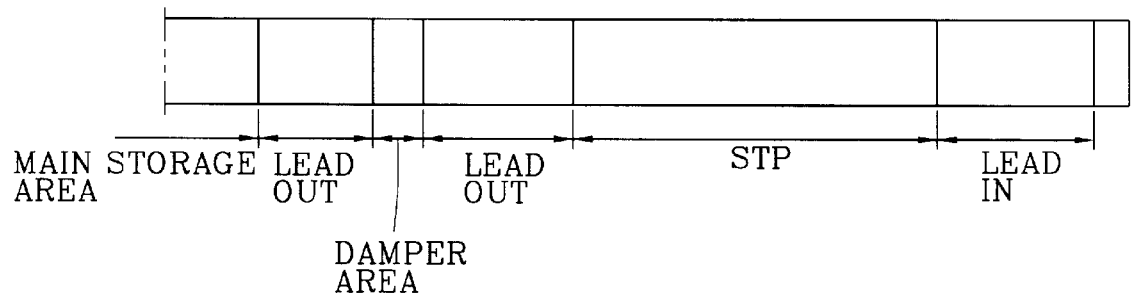

Next in step S110, the controller 36 causes the pick-up unit 32 to record test data in the optical disk in an out-to-in fashion as shown in FIG. 8B. As shown in FIG. 8B, the test data STP is recorded beginning at the end of the recording area and radially inward towards the center of the optical disk. Specifically, as shown in FIG. 8B, a lead-in area to the test data STP is recorded, then the test data STP is recorded, and finally a lead-out for the test data STP is recorded. The lead-out for the test area STP is recorded sufficiently before the beginning of the lead-out for the main storage area such as to leave a damper area between the lead-out for the main storage area and the lead-out for the test data STP. When recording the test data from out-to-in, the controller 36 moves the pick-up 32-2 radially in toward the center of the optical disk while tracking the optical disk.

After recording the test data in step S110, processing proceeds to step S70. In step S70, the controller 36 updates the TOC data for the optical disk to indicate the location of the test data, and the lead-in and lead-out of the test data.

Quality Test Method

The quality test operation of the optical disk quality test apparatus according to the present invention will now be described with respect to FIGS. 3A–6 and 9. FIG. 9 illustrates the method for testing the quality of an optical disk according to the present in/vention. As shown in FIG. 9, in step S200, the controller 36 controls the pick-up unit 32 to reproduce and output the TOC data for the optical disk 31-1. Next in step S220, the controller 36 determines whether the user has input a quality test request. If no quality test request has been input, processing ends. If a quality test request has been input, then in step S230, the controller 36 detects the current location of the pick-up 32-2 in any well known manner.

Based on the location of the lead-in for the test data indicated in the TOC data and the current location of the pick-up 32-2, the controller 36 moves the pick-up 32-2 to the lead-in of the test data in step S240. Besides indicating the location of the lead-in for the test data, the TOC data also indicates via this location data whether the test data was recorded radially in-to-out or radially out-to-in. In accordance with this determination, the controller 36 causes the pick-up 32-2 to reproduce the test data in step S250.

Figure 5A:
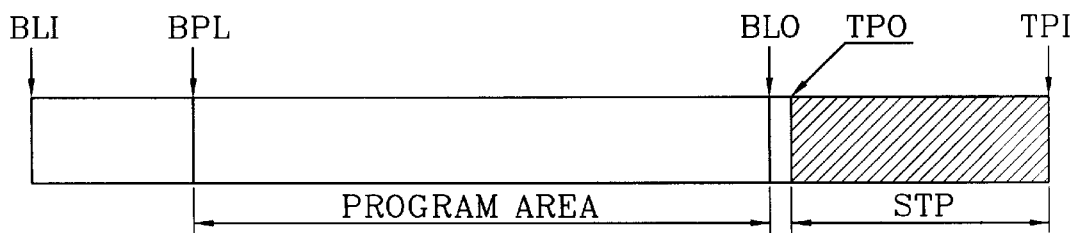
FIGS. 5A and 5B illustrate one method of reproducing test data according to the present invention.
Figure 5B:
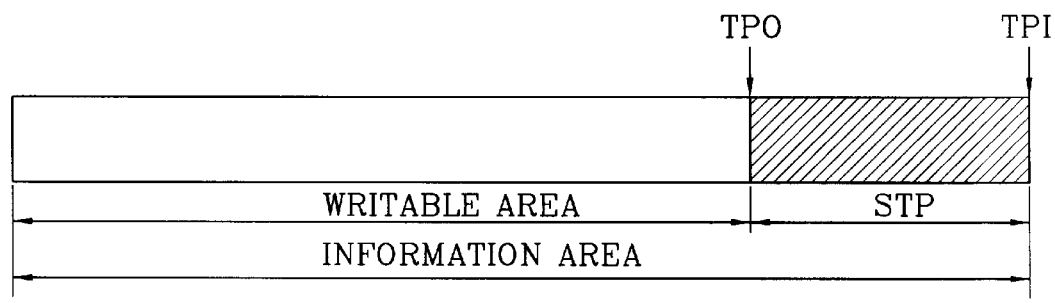
Figure 5C:
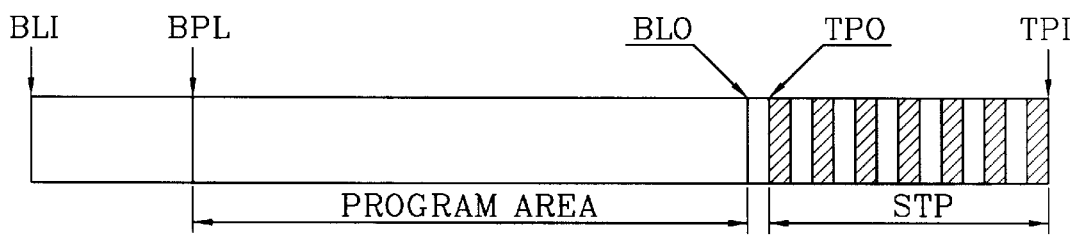
FIGS. 5C and 5D illustrate another method of reproducing test data according to the present invention.
Figure 5D:
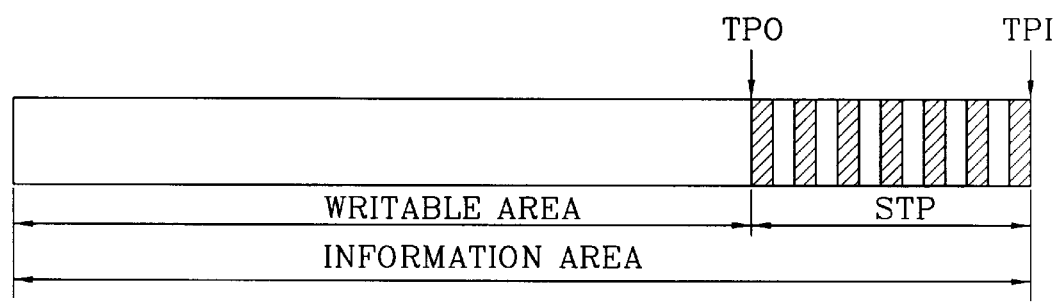
Figure 5E:
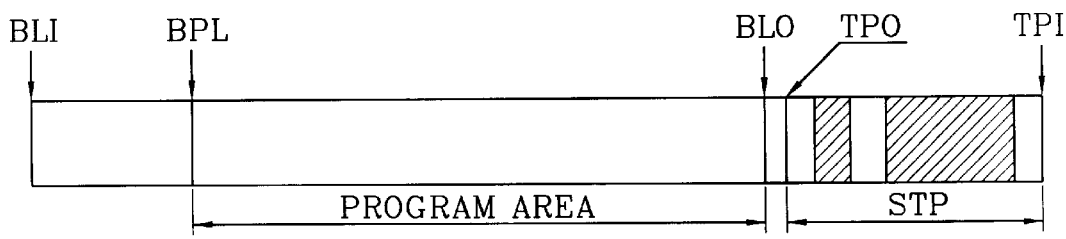
FIGS. 5E and 5F illustrate a further method of reproducing test data according to the present invention.
Figure 5F:
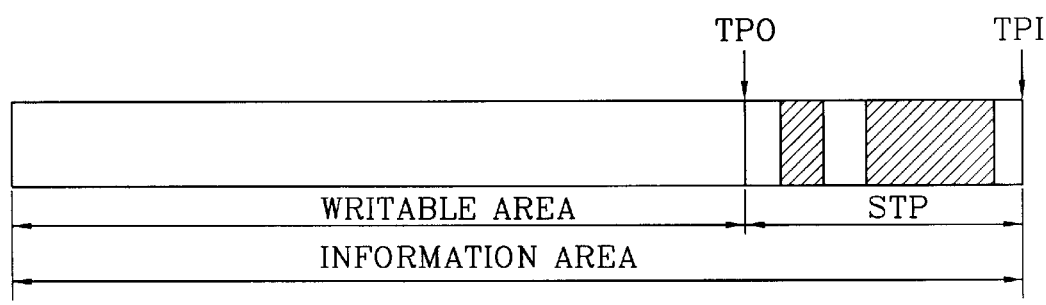

The test data can be sequentially reproduced as shown in FIG. 5A for a prerecorded optical disk or as shown in FIG. 5B for a write-once optical disk, or the test data can be reproduced at predetermined intervals such as shown in FIG. 5C for a prerecorded disk and FIG. 5D for a write-once optical disk. Additionally, predetermined selected portions of the test data can be reproduced such as shown in FIG. 5E for a prerecorded disk and FIG. 5F for a write-once optical disk.

In step S260, the reproduced test data is processed by the RF amplifier 33 and output to the comparator 35. Under the control of the controller 36, the comparator 35 performs a comparison of the test data to predetermined data stored in memory 34, and the controller 36 judges the quality of the optical disk 31-1 based on the comparison results. One or a combination of several quality test operations can be performed by the comparator 35 and the controller 36. These quality test methods include a pit pattern test, a bit pattern test, and an analog signal test.

Pit Pattern Test

Figure 10A:
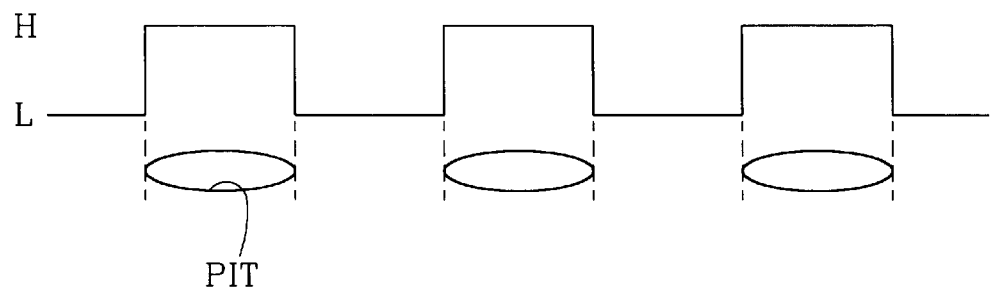
FIG. 10A illustrates the relationship between a pit pattern on an optical disk and a reproduced pit pattern signal.

In a CD and digital video disk (or digital versatile disk) DVD, the smallest bit pattern is 3T while the largest bit pattern for a CD is 11T and for a DVD is 14T. The designation 3T, 4T, etc., is a measure of the pit length which corresponds to a predetermined bit pattern. FIG. 10A illustrates the relationship between the signal output from RF amplifier 33 and the pits representing test data in the optical disk 31-1. As shown in FIG. 10A, the signal output from the RF amplifier 33 transitions from, for example, a low to a high state at the beginning of a pit, remains high for the length of the pit, and transitions from a high to a low state at the end of the pit. The transitioning of the signal output from the RF amplifier 33 represents a bit value of 1, while the length of time that the signal output from the RF amplifier 33 remains high represents a number of 0s. A 3T pit represents the bit stream 1001. A 4T pit, which is longer than a 3T pit, represents the bit pattern 10001. As the pit pattern increases sequentially from 3T to 11T or 14T, so does the number of 0s.

When testing quality using the pit pattern method, the same pit pattern is recorded over an over again as test data. In a preferred embodiment, the pit pattern recorded is the 3T pit pattern. Because the 3T pit pattern is the smallest pit pattern, errors are much more likely to be detected.

The comparator 35 compares the pit pattern signal output by the RF amplifier 33, such as shown in FIG. 10A, to a reference signal stored in the memory 34. The reference signal represents the pit pattern recorded on the optical disk. Each portion of the pit pattern signal representing one pit which matches the reference signal corresponds to recognized data. For instance, when the 3T pit pattern is used, each recognized pit represents four bits of recognized data. The comparator 35 determines the total amount of recognized test data, and then compares the total amount of recognized test data to a predetermined recognized data threshold stored in the memory 34. The memory 34 stores a recognized data threshold associated with each method of reproduction shown in FIGS. 5A–5F (i.e., sequential, periodic, and selected portions). Therefore, depending upon the type of reproduction (sequential, periodic, or selected portions) a different recognized data threshold value is selected and used by the comparator 35. The comparator 35 outputs the results of the comparison to the controller 36.

If the amount of recognized data is greater than the recognized data threshold, the controller 36 determines that the optical disk is of good quality in step S260. Otherwise, the controller 36 determines in step S260 that the optical disk is of poor or bad quality.

Bit Pattern Test

Instead of or in addition to the pit pattern test, a bit pattern test can be performed to judge the quality of the optical disk 31-1. In the bit pattern test, the pit pattern signal is converted into a bit stream. Namely, each pit is converted into its representative bits. The resulting bit pattern is compared by the comparator 35 to a reference version of the bit pattern stored in the memory 34. Unlike the pit pattern test, the bit pattern test does not require that the same pit pattern be recorded over and over in the optical disk 31-1 as test data. Any predetermined pit arrangement can be recorded in the optical disk 31-1 as test data. The reference bit pattern stored in the memory 34 corresponds to the pit pattern recorded in the optical disk 31-1.

The comparator 35 compares the bit pattern derived from the pit pattern signal to the reference bit pattern on a pit-by-pit basis. In other words, each group of bits corresponding to a pit is compared to a corresponding group of bits in the reference bit pattern.

If a match exists, the matching bits are considered as recognized. The comparator 35 sums the total amount of recognized data, and compares the total recognized amount of data to a predetermined recognized data threshold stored in the memory 34. The result of the comparison is output to the controller 36. As with the pit pattern test, the memory 34 stores recognized data thresholds associated with the sequential, periodic, and selected portions modes of reproduction. Therefore, the recognized data threshold depends upon the mode of reproduction (sequential, periodic, or portions).

The controller 36 determines that the optical disk 31-1 is of good quality if the total amount of recognized data exceeds the recognized data threshold; otherwise, the controller 36 determines that the optical disk 31-1 is of poor quality.

Analog Signal Test

Figure 10B:
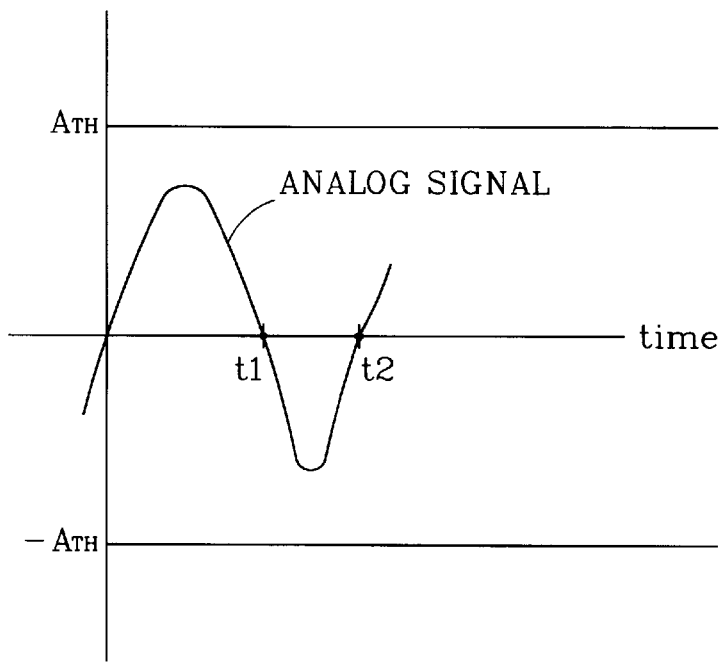
FIG. 10B illustrates a sample of a reproduced analog signal.

Instead of or in addition to both or either of the pit pattern test and the bit pattern test, an analog signal test can be performed to determine the quality of the optical disk 31-1. In this analog signal test, the bit pattern derived from the pit pattern signal is digital-to-analog converted by the comparator 35 to obtain an analog signal such as shown in FIG. 10B. The comparator 35 then performs either or both of an amplitude and frequency test on the analog signal. In the amplitude test, the comparator 35 compares the amplitude of the analog signal to an amplitude threshold range indicated as $A_{TH}$ and $-A_{TH}$ in FIG. 10B.

In the frequency test, the comparator 35 compares the zero crossover points such as t1 and t2 shown in FIG. 10B to predetermined time threshold ranges corresponding to each crossover point. More specifically, because the test data recorded on the optical disk 31-1 is predetermined, the resulting analog signal is also known; and therefore, the zero crossover points are known. Factoring in an empirically determined margin of error for these zero crossover points results in a time threshold range for each of the zero crossover points of the reproduced analog signal. The time threshold range for each zero crossover point is then stored in the memory 34.

Of course, as with the other test methods, the stored time threshold ranges used depend upon the reproduction mode (sequential, periodic, or selected portions).

The quality of the optical disk 31-1 can be judged based on the amplitude test, the frequency test, or both the amplitude and frequency tests. If the amplitude of the analog signal exceeds the amplitude threshold range, then the controller 36 determines that the optical disk 31-1 is poor quality. Also, if a zero crossover point of the analog signal falls outside the corresponding time threshold range, the controller 36 determines that the optical disk 31-1 is of poor quality. If the controller 36 does not reach a poor quality judgement based on the amplitude test, the frequency test, or both the amplitude and frequency test, then the controller 36 determines that the optical disk 31-1 is of good quality.

Next, in step S270, if the controller 36 judges the optical disk 31-1 to be of poor quality, then processing proceeds to step S280, and the controller 36 drives the indicator 38 and processing ends. In this manner, a user is alerted that the optical disk under test is a poor quality optical disk. If the optical disk is judged to be of good quality in step S270, then processing ends.

As discussed above, the pit pattern test, the bit pattern test, the amplitude test, and the frequency test can be used individually or in conjunction with one another to determine the quality of the optical disk.

Also, in addition to the above described quality testing, the optical disk can undergo additional mechanical and signal quality tests. For instance, the entire surface of the optical disk is displayed by monitoring the scanning of the optical disk surface with a laser beam using a CCD camera. The surface is then visually checked using the display.

Other tests include push/pull, crosstalk, and checking the location of the lead-in start point BLI, main storage area start point BPL, and lead-out start point BLO.

Through the above described test process, mechanical characteristic measurements such as the lead-in start point BLI, the main storage area start point BPL, the lead-out start point BLO, a track and index start point, a test speed, a track pitch, a bow deflection, a warp deflection, a thickness of the optical disk, an angular deflection, a vertical deflection, the radius of the optical disk, and the diameter of the center hole of the optical disk are checked.

SECOND EMBODIMENT OF AN OPTICAL DISK QUALITY TEST APPARATUS

Figure 11:
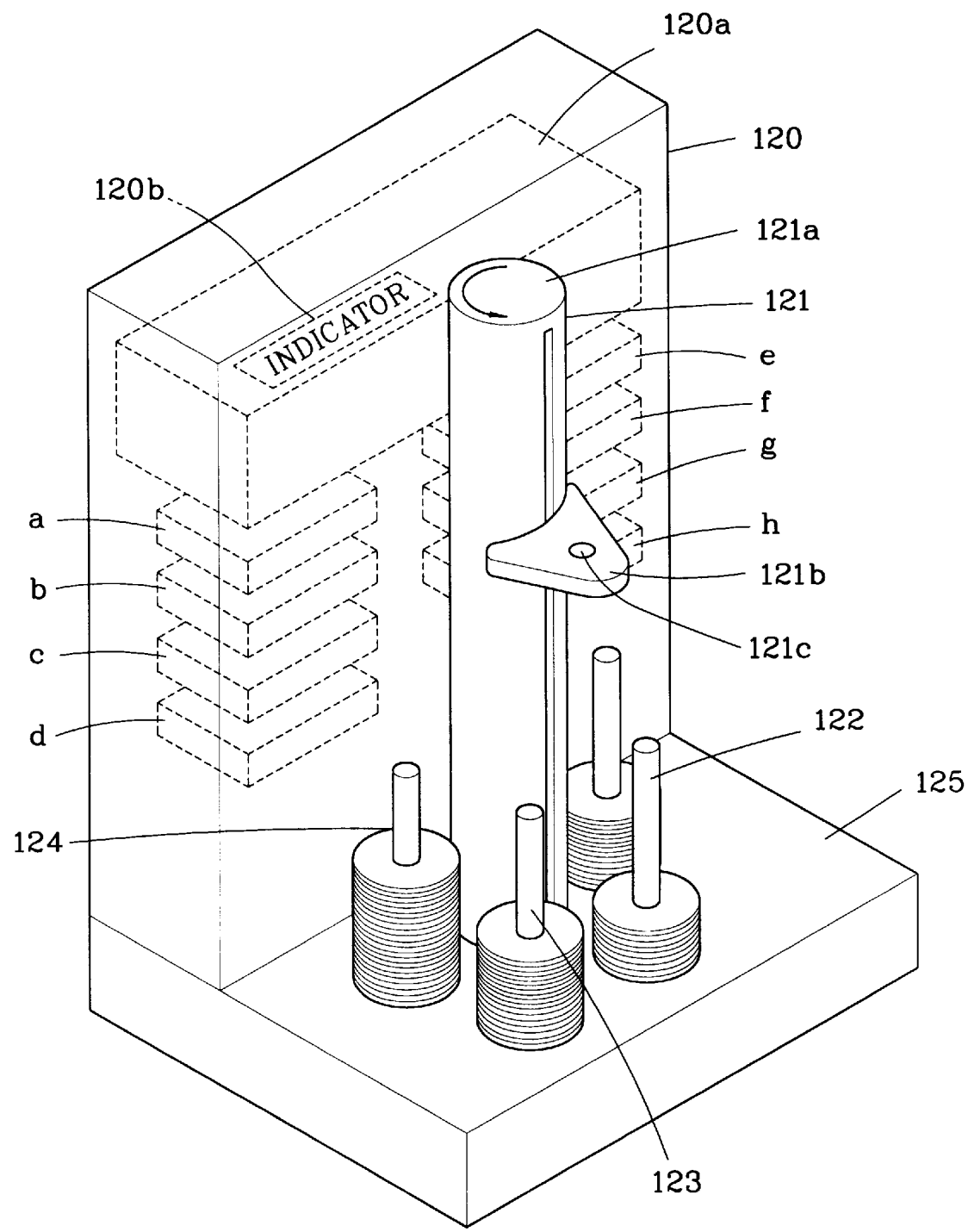
FIG. 11 is a perspective view illustrating another embodiment of an apparatus for an optical disk quality inspection according to the present invention.

FIG. 11 is a perspective view of another embodiment of a quality inspection apparatus according to the present invention, wherein there are provided a drive mounting unit 120, a disk transfer member 121 and first to third spindles 122–124.

The drive mounting unit 120 includes a controller 120a for carrying out a control operation and a quality determination operation, and a plurality of drives a–h for recording/playingback a standard test program (STP) on/from an outer area of the optical disk. The controller 120a may be disposed external to the drive a–h, and the drives a–d and the drives e–h are disposed to face each other. An indicator 120b is optionally connected to the controller 120a, and may form part of the drives a–h instead of being external thereto.

The disk transfer member 121 includes a circular shaft 121a, rotated by an motor M1 (see FIG. 13), and a pick-up 121b, attached to the circular shaft 121a, movable up and down along the circular shaft 121a. A touch sensor 121-8 (See FIGS. 13 and 14) for sensing contact with a disk is provided at a lower portion of the pick-up 121b, and the pick-up 121b includes at least one suction hole 121-5 (see FIG. 15) for carrying the disk. The pick-up 121b also includes a control hole 121c. First-third spindles 122–124 are disposed circumferentially around and equidistant from the circular shaft 121a such that when the pick-up 121b moves vertically downward over the first-third spindles 122–124, the first-third spindles 122–124 extend through the control hole 121c.

The first spindle 122 has a plurality of disks stacked thereon, the second spindle 123 has a plurality of disks determined as "good" stacked thereon, and the third spindle 124 has disks determined as "bad" stacked thereon. The disks on the first spindle 122 have been processed up to the creation of the protection layer. At least one first spindle 122 should be provided, and approximately 150–200 disks may be stacked on each spindle.

Figure 12:
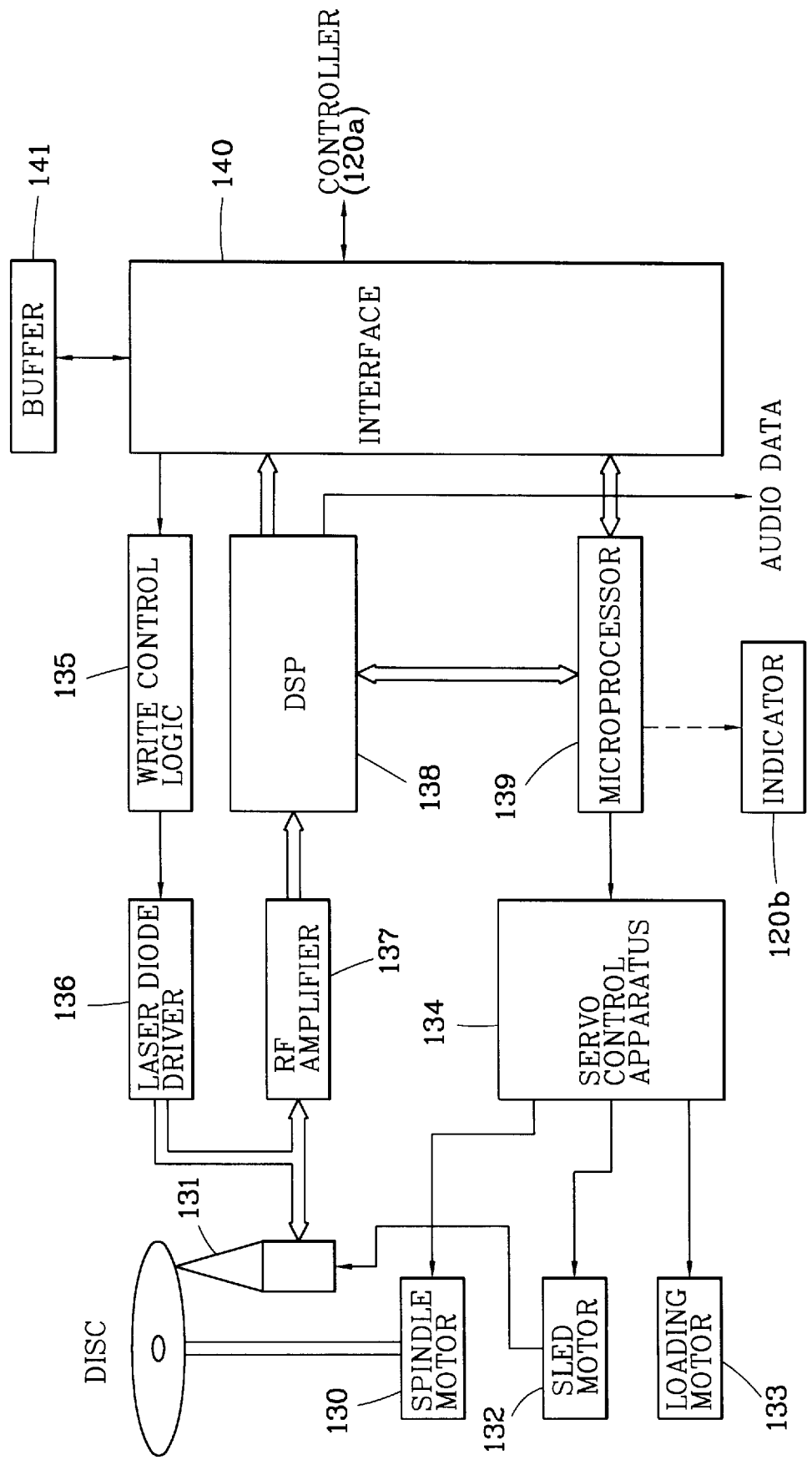
FIG. 12 is a block diagram detailing the architecture of a drive in FIG. 11.

As shown in FIG. 12, the plurality of drives a–h respectively include a spindle motor 130 for rotating an optical disk mounted on a tray, an optical pick-up 131 for recording/playingback test data STP on/from an outer area of the optical disk, a sled motor 132 for moving the optical pick-up 131 along a wobbled pre-groove, a loading motor 133 for carrying out a loading operation of the system, a servo control apparatus 134 for controlling the spindle motor 130, the sled motor 132 and the loading motor 133, a write control logic 135 for receiving the test data STP from the external controller 120a and outputting a driving signal, a laser diode driver 136 for driving a laser diode (not shown) of the optical pick-up 131 in accordance with a driving signal output from the write control logic 135, an RF amplifier 137 for amplifying the signal played back from the optical pick-up 131, a digital signal processor (DSP) 138 for demodulating an output of the RF amplifier 137 and correcting errors, a microprocessor 139 for outputting the playedback test data output from the digital signal processor 138 to the external controller 120a, an interface 40 for encoding or decoding input data and carrying out data transmission between a drive a–h and the external controller 120a or between peripheral devices, and a buffer 141 for temporarily storing the data inputted to or outputted from the interface 140. As further shown, each of the drives a–h optionally includes the indicator 120*b* connected to the microprocessor 139.

OPERATION OF SECOND EMBODIMENT OF OPTICAL DISK QUALITY TEST APPARATUS

An optical disk with its protection layer coating formed thereon is stacked on the first spindle 122 during an optical disk fabrication process. When quality inspection is ordered by an operator via a user interface (not shown), the disk transfer member 121 picks up an optical disk stacked on the first spindle 122 and mounts it on one of the plurality of drives a–h of the drive mounting unit 120 in accordance with the control of the controller 120*a* disposed at the drive mounting unit 120.

The operation of picking up and moving an optical disk will now be described in detail along with the structure of the disk transfer member 121.

As discussed above, once a quality inspection is ordered by an operator, the circular shaft 121*a* of the disk transfer member 121 rotates according to the control of the controller 120*a* and stops where the center of the control hole 121*c* (see FIG. 13) of the pick-up 121*b* corresponds to the center of the first spindle 122. Namely, the rotational angle of the pick-up 121*b* with respect to the first spindle 122 is controlled by the rotation of the circular shaft 121*a*.

Figure 13:
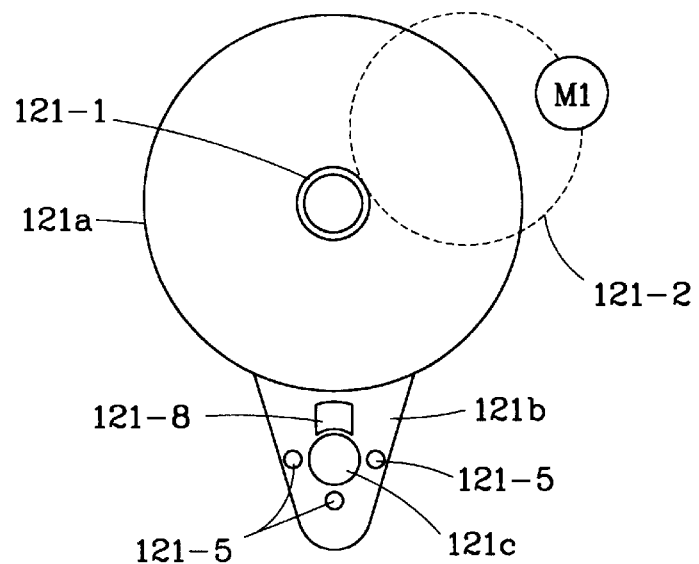
FIG. 13 is a schematic plan view illustrating the structure of the disk transfer member for rotating the pick-up in FIG. 11.

FIG. 13 illustrates an embodiment of the structure of the disk transfer member 121 for rotating the pick-up 121*b*. As shown therein, a central shaft 121-1 of the circular shaft 121*a* is connected to a driving motor M1 through a transfer gear 121-2. The rotational force of the driving motor M1 is transferred to the central shaft 121-1, whereby the rotational angle of the pick-up 121*b* is controlled by the rotation of the circular shaft 121*a*.

The circular shaft 121*a* is rotatably supported by the central shaft 121-1 on a base body support.

The rotational angle control of the circular shaft 121 is achieved by controlling the rotational number of the driving motor M1, and the rotational number of the driving motor is controlled based on output from a rotational number detecting apparatus (not shown) such as an encoder. The rotational angle of the pick-up 121*b* is controlled by the circular shaft 121*a* to position the pick-up 121*b* over one of the first to third spindles 122–124.

As another preferred embodiment of the structure of the disk transfer member 121 providing rotational movement, the driving force of the driving motor M1 is directly transferred to the outer periphery of the circular shaft 121 or the central shaft 121-1 and the driving motor M1 are connected by a belt.

When location control of the pick-up 121*b* with regard to the first spindle 122 has been completed, the pick-up 121*b* moves downward according to the control of the controller 120*a*, so that the first spindle 122 passes through the control hole 121*c* and approaches the optical disk. When the pick-up 121*b* moves downward to come in contact with the optical disk, the touch sensor (not shown) displaced at a lower portion of the pick-up 121*b* detects the contact between the pick-up 121*b* and the optical disk, and the detected value is output to the controller 120*a*.

Figure 14:
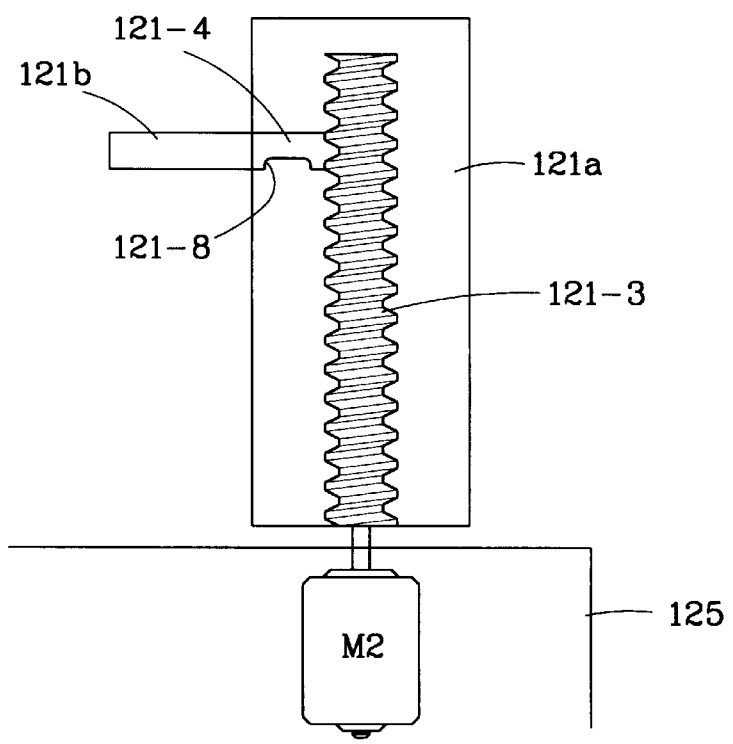
FIG. 14 is a schematic cross-sectional view illustrating the structure of the disk transfer member for vertically moving the pick-up in FIG. 11.

FIG. 14 illustrates a preferred embodiment of the structure in the disk transfer member 121 for vertically moving the pick-up 121*b*. As shown therein, a worm gear 121-3, which rotates under the control of a motor M2, is disposed inside the circular shaft 121*a*, and a tooth molding is formed at a side portion of an arm 121-4 connected to the pick-up 121*b*. The tooth molding of the arm 121-4 engages the tooth molding formed at the outer periphery of the worm gear 121-3.

As another preferred embodiment of the structure in the disk transfer member 121 for vertically moving the pick-up 121*b*, the pick-up 121 is disposed on a rack, and a pinion for driving the rack is connected to a motor. The rotational movement of the pinion causes vertical movement of the rack; thereby moving the pick-up 121*b* vertically.

As another alternative, the structure in the disk transfer member 121 for vertically moving the pick-up 121*b* includes an endless belt provided at upper and lower end portions of an interior of the circular shaft 121*a*. The pick-up 121*b* is attached at a middle portion of the endless belt, and the rotational force of a motor is transferred to a driving pulley for the endless belt; thereby enabling vertical movement of the pick-up 121*b*.

Figure 15:
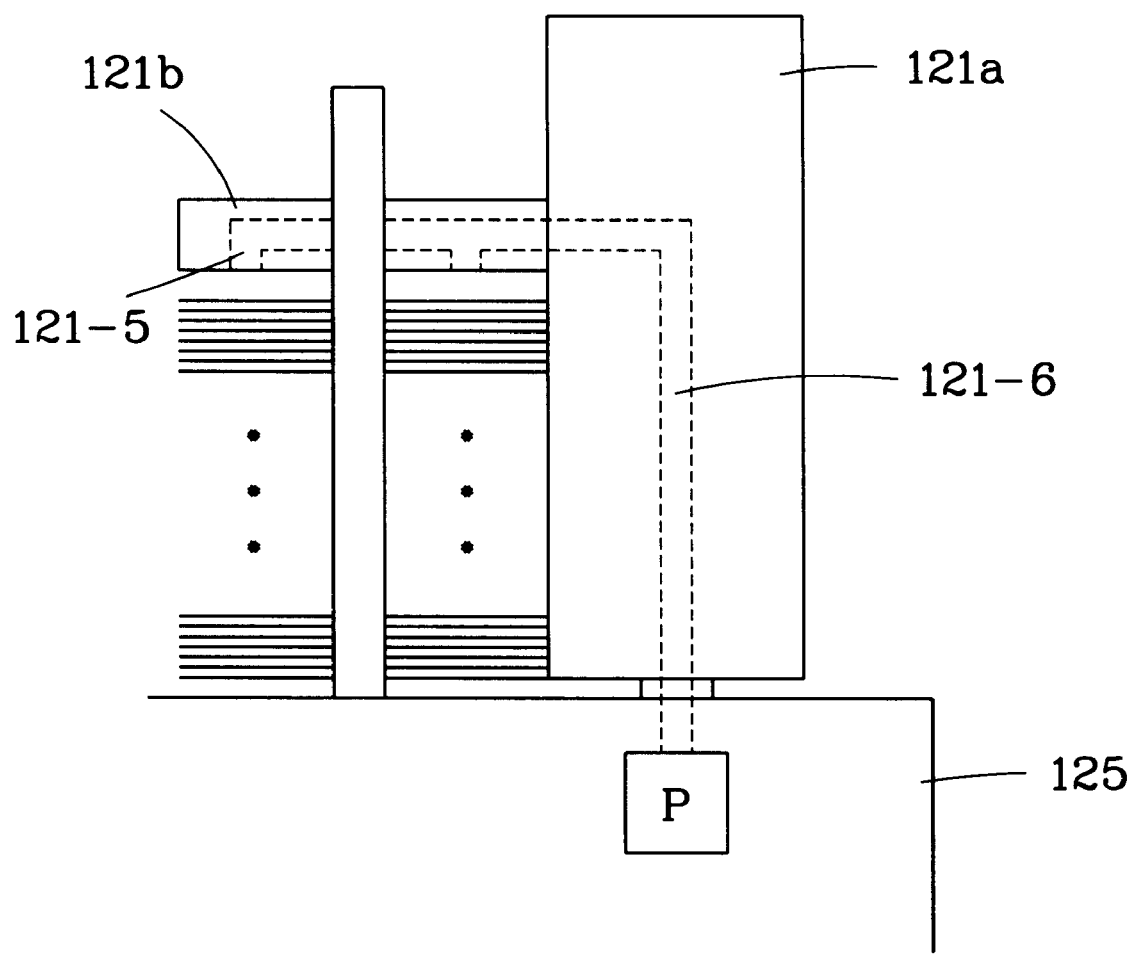
FIG. 15 is a schematic cross-sectional view illustrating an embodiment of the pick-up in FIG. 11.

FIG. 15 is a schematic cross-sectional view of the pick-up 121*b*. As shown therein, suction holes 121-5 are formed in a lower surface of the pick-up 121*b*, and the suction holes 121-5 are connected through a pipe member 121-6 to a vacuum pump P.

When the pick-up 121*b* comes in contact with an optical disk, the controller 120*a* drives the vacuum pump P in accordance with a sensing signal from the touch sensor (not shown), and when the vacuum pump P is driven, a suction force is generated at the suction holes 121-5 connected to the pipe member 121-6; whereby the target optical disk is sucked to the pick-up 121*b*.

When the optical disk is sucked by the pick-up 121*b*, the pick-up 121*b* moves toward the plurality of drives a–h in accordance with the above-described vertical movement. Here, in order for the pick-up 121*b* to move toward the drives a–d, the pick-up 121*b* makes a leftward rotation to a predetermined extent and then moves vertically. To move toward the drives e–h, the pick-up 121*b* rotates to the right by a predetermined extent, and then moves vertically. When the pick-up 121*b* is assigned by its vertical movement to a target drive of the drives a–h, respective trays of the drives a–h are opened in accordance with the control of the controller 120*a*.

At this time, the controller 120*a* stops the operation of the vacuum pump P, which removes the suction force of the pick-up 121*b*, and the optical disk is disposed on a tray of a drive a–h above which the pick-up 121*b* is positioned.

Alternatively, the vertical movement of the pick-up 121*b* is followed by rotation to position a disk at a disk drive a–h. This way a tray of a disk drive a–h is opened prior to transfer of a disk.

When the optical disk is mounted in one of the drives a–h, the drives a–h respectively records/playsback the test data STP on/from the outer area of the optical disk under the control of the controller 120*a*. The controller 120*a* compares the playedback data to reference data to determine disk quality. The controller 120*a* or the microprocessor 139 under the control of the controller 120*a* performs the functions of the comparator 35 and the controller 36 in FIG. 6. Also, the memory 141 or memory (not shown) associated with the controller 120*a* functions the same as the memory 34 in FIG. 6. Namely, the controller 120*a* causes the disk quality inspection method discussed above with respect to FIGS. 4A–10B to be performed to determine whether a disk is of good or bad quality. Accordingly, a description of this method will not be repeated.

Once the disk quality is determined, the disk transfer member 121 picks up the optical disk loaded into the drive a–h under the control of the controller 120*a*. The disks determined "good" are stacked on the second spindle 123 and the disks determined "bad" are stacked on the third spindle 124.

Finally, the optical disks determined "good" are labeled to complete the production thereof, whereas the optical disks determined "bad" are discarded. Those steps are automatically carried out with regard to all the optical disks manufactured.

THIRD EMBODIMENT OF AN OPTICAL DISK QUALITY TEST APPARATUS

Figure 16:
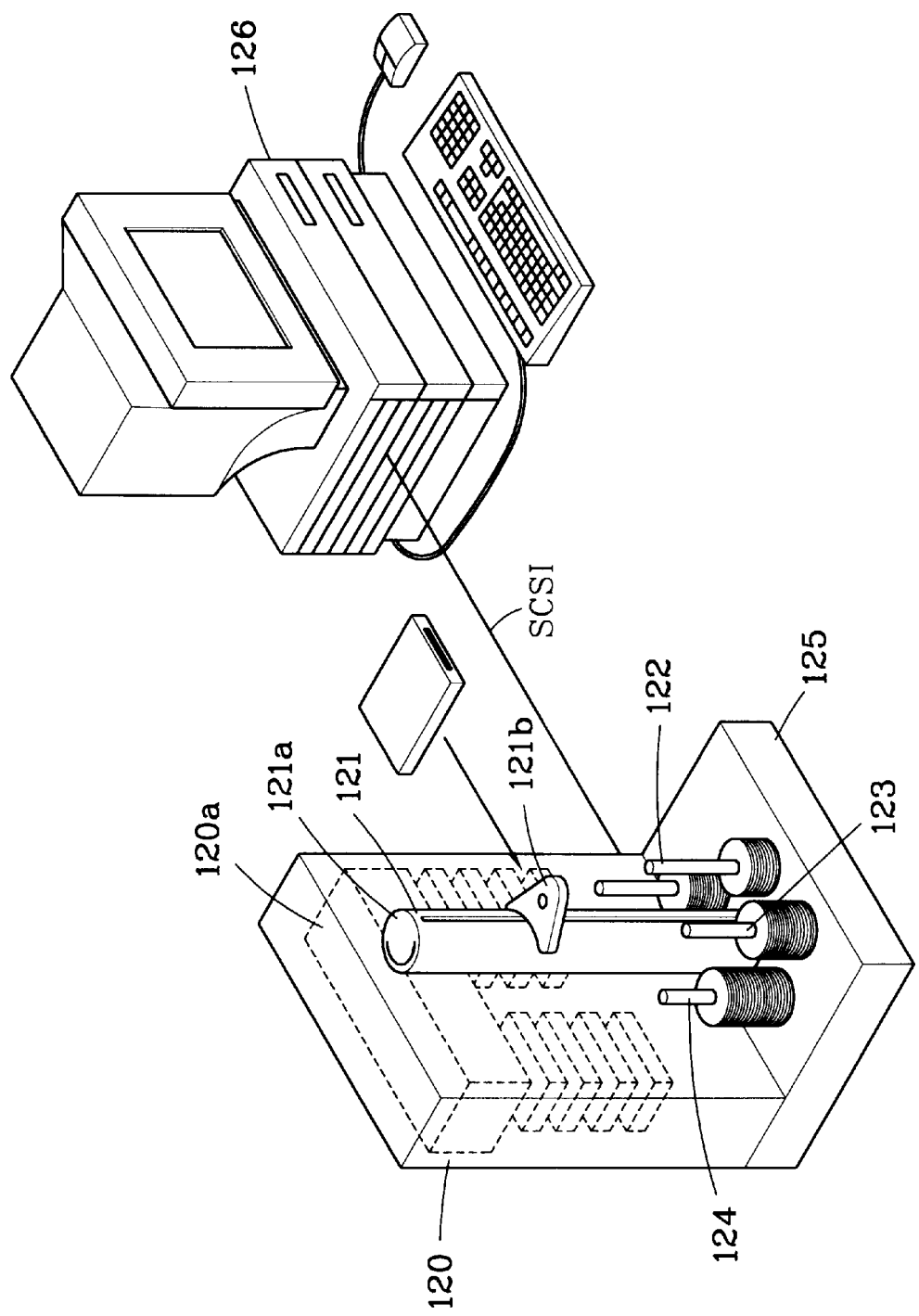
FIG. 16 is a system view illustrating an entire system including another embodiment of an optical disk quality inspection apparatus according to the present invention.

FIG. 16 is a view illustrating another embodiment of an optical disk quality inspection apparatus according to the present invention. As shown therein, the optical disk quality inspection apparatus of the second embodiment is connected to an external computer 126 through a SCSI bus. In this third embodiment, the computer 126 transmits test data STP to the controller 120*a* disposed in the quality inspection apparatus. The computer 126 also, optionally, receives the playedback test data STP through the SCSI bus so as to determine the disk quality. In this embodiment, the computer 126 makes the quality determination as opposed to the controller 120*a*. However, the computer 126 can use the same previously described methodology to determine whether a disk is of good or bad quality.

An operator may control the operation of the quality inspection apparatus using the computer 126. Therefore, the quality determining operation of an optical disk may be selectively carried out by the microprocessor 139 and/or the controller 120*a*, which are disposed in the quality inspection apparatus; or may be carried out by the external computer 126.

ALTERNATIVE METHOD OF OPERATION FOR SECOND AND THIRD EMBODIMENTS OF THE OPTICAL DISK QUALITY TEST APPARATUS

Figure 17:
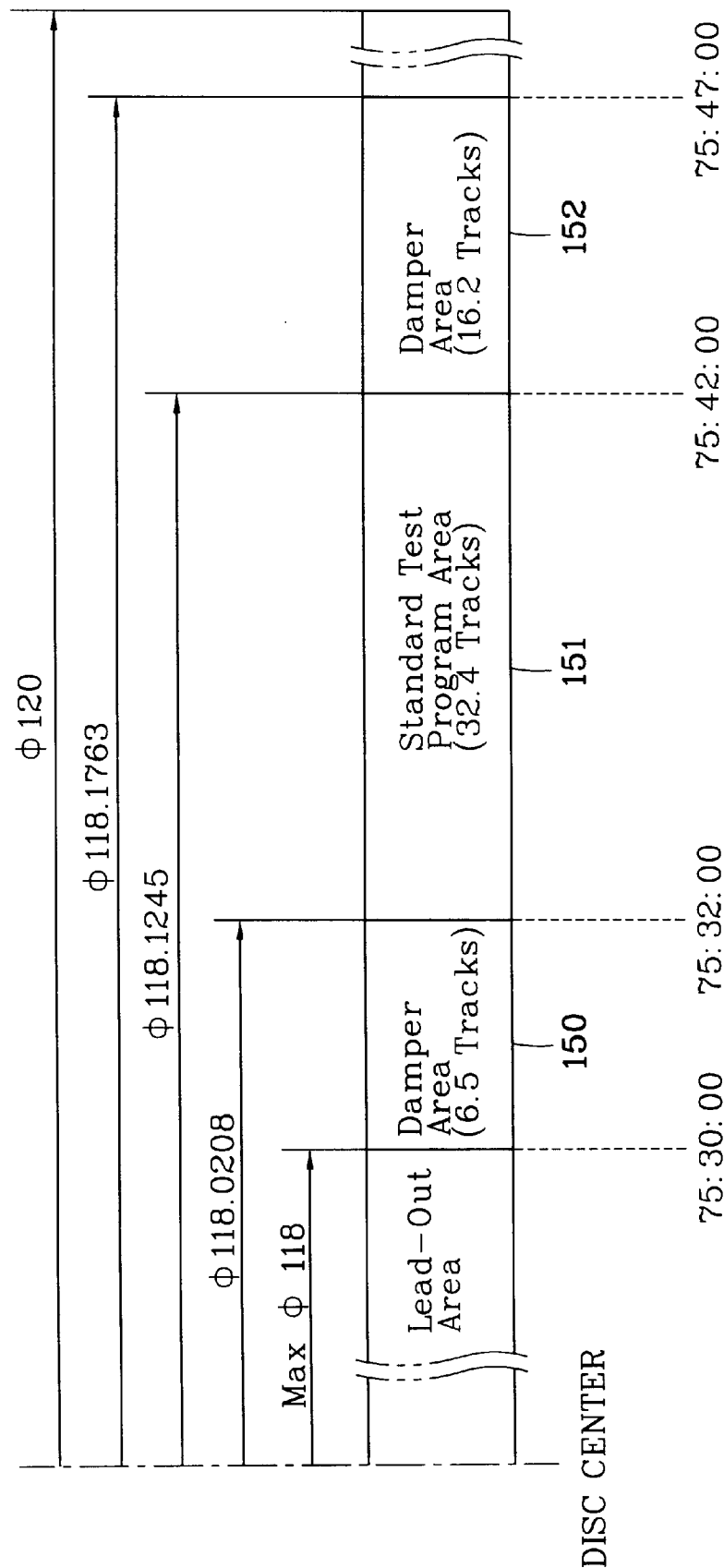
FIG. 17 illustrates a data format on an outer area of an optical disk according to the present invention.

Prior to discussing this alternative method, the information state of the optical disk illustrated in FIG. 8A, will be discussed in more detail with respect to the FIG. 17; wherein the lead in area shown in FIG. 8A forms part of either the damper area 150 or the STP area 151 of FIG. 17. For the purposes of discussion only, the optical disk illustrated in FIG. 17 is a 74 minute CD-R disk.

The test data STP recording area for inspecting optical disk quality according to this method is an outer area which is generally outside of a diameter of 118 mm of the entire diameter of 120 mm for a recording layer of the optical disk. In a general 74-minute CD-R disk, a lead-out area is completed at ATIP (absolute time in pre-groove) of 75:30:00 (75 minutes, 30 seconds, and 00 blocks of data). Therefore, as shown in Table 1, the outer area ranges from 118 mm (Ø118), which is ATIP 75:30:00 where the lead-out area is completed, to 118:1763 mm(Ø118.1763), which is ATIP 75:47:00. In this method, the ATIP is used to represents a location of the optical pick-up 131 on the disk.

|  | Prior Art | Present Invention |
|---|---|---|
| Entire Storage Area | Max. 0118 | Max. 0118.1763 |
| Absolute Time | 75:30:00 | 75:47:00 |

Also, the outer area includes first and second damper areas 150, 152 respectively disposed at the front and rear of the STP area 151. The entire number of tracks in the outer area is about 55 tracks, and it takes approximately 12 seconds for the optical pick-up 131 in a double speed drive to trace these 55 tracks.

The first damper area 150 is an allowance area of about 6.5 tracks and allows accurate placement of the optical pick-up 131 at the STP area 151 when the optical pick-up 131 moves from an inner circumference to outer circumference. That is, the allowance area ends at an ATIP of 75:32:00 and a diameter of ø118.0208.

The STP area 151 includes 32.4 tracks for recording test data STP, and ends at an ATIP of 75:42:00 and a diameter of ø118.0208. The number of tracks in the STP area 151, however, is not fixed, but instead, is determined by the capacity of the equipment an operator employs. When the optical pick-up 131 is the optical pick-up for a four times drive, tracing the STP area 151 takes 6–7 seconds. At this time, since the number of tracks sets the quantity of test data STP, the greater the number of tracks, the more accurate the disk quality inspection becomes.

A second damper area 152 is an allowance area of approximately 16.2 tracks in order for the optical pick-up 131 to be accurately placed on the STP area 151. The second damper area 152 ends at an ATIP of 75:47:00 and a diameter of ø118.1763.

The test data STP employed in this method of the present invention, as shown in FIG. 18, varies between decimal numbers of 0–1155 (e.g., all the ASCII codes, audio data, and null data). Among these decimal numbers, this method preferably employs selected ASCII codes (more preferably ASCII code 242), and the selected ASCII codes are sequentially binary-converted and EFM-converted for recording.

In the above converting step, the test data STP are converted to a variety of pit sizes varying from 3T to 11T. As discussed previously, because the 3T pit pattern is the smallest pit pattern, errors are much more likely to be detected. When the test data STP are EFM-converted, ASCII code 242 includes many 3T pulses relative to other codes, so that it is easy to detect errors during playback. Accordingly, the present invention more preferably employs ASCII code 242 as the test data STP.

The operations of recording/playingback and disk quality determination according to this alternative method will now be explained with respect to the flowcharts in FIGS. 19–23 and the second embodiment of the optical disk quality inspection apparatus shown in FIG. 11.

Figure 19:
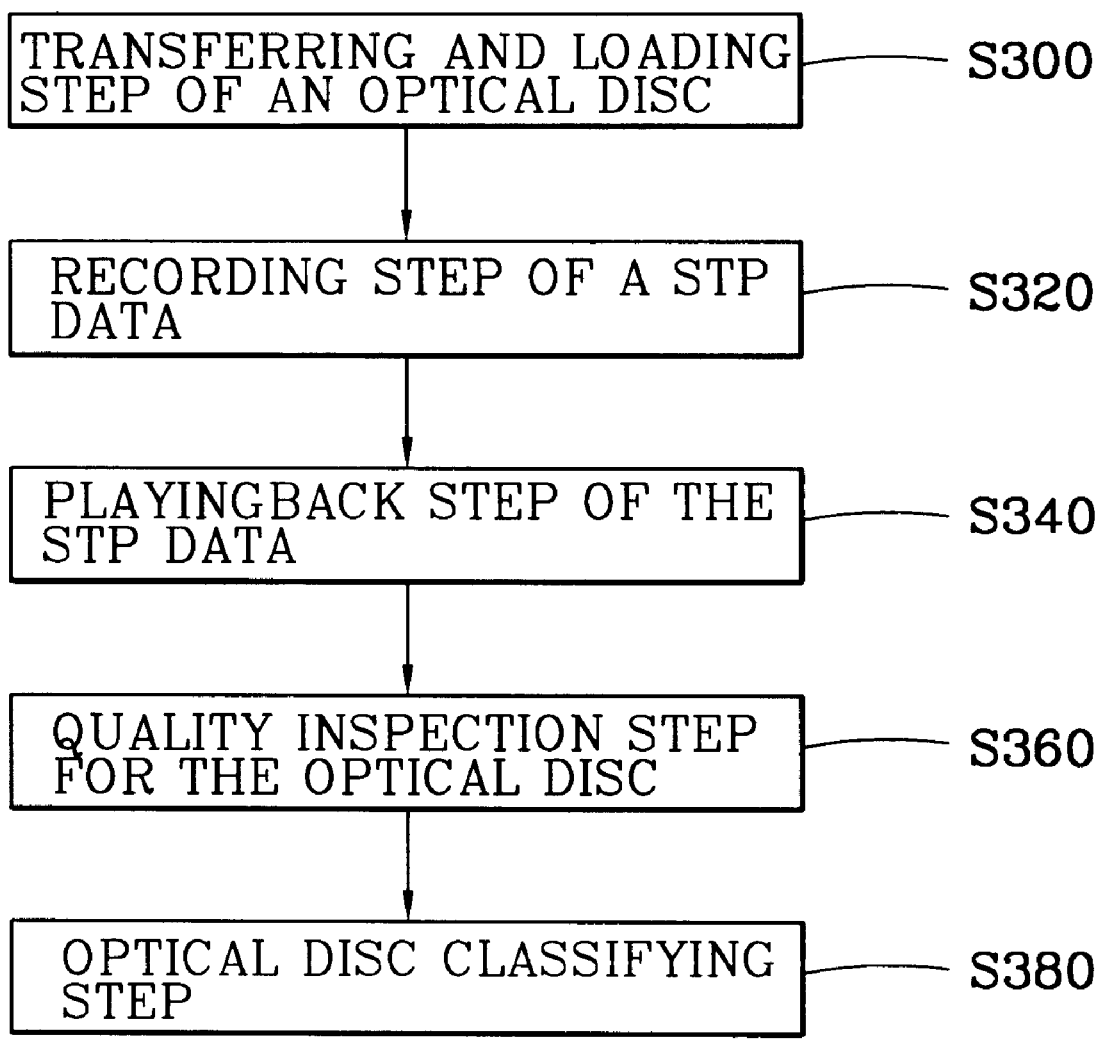
FIG. 19 illustrates a flow chart of a method for optical disk quality inspection according to the present invention.
Figure 20:
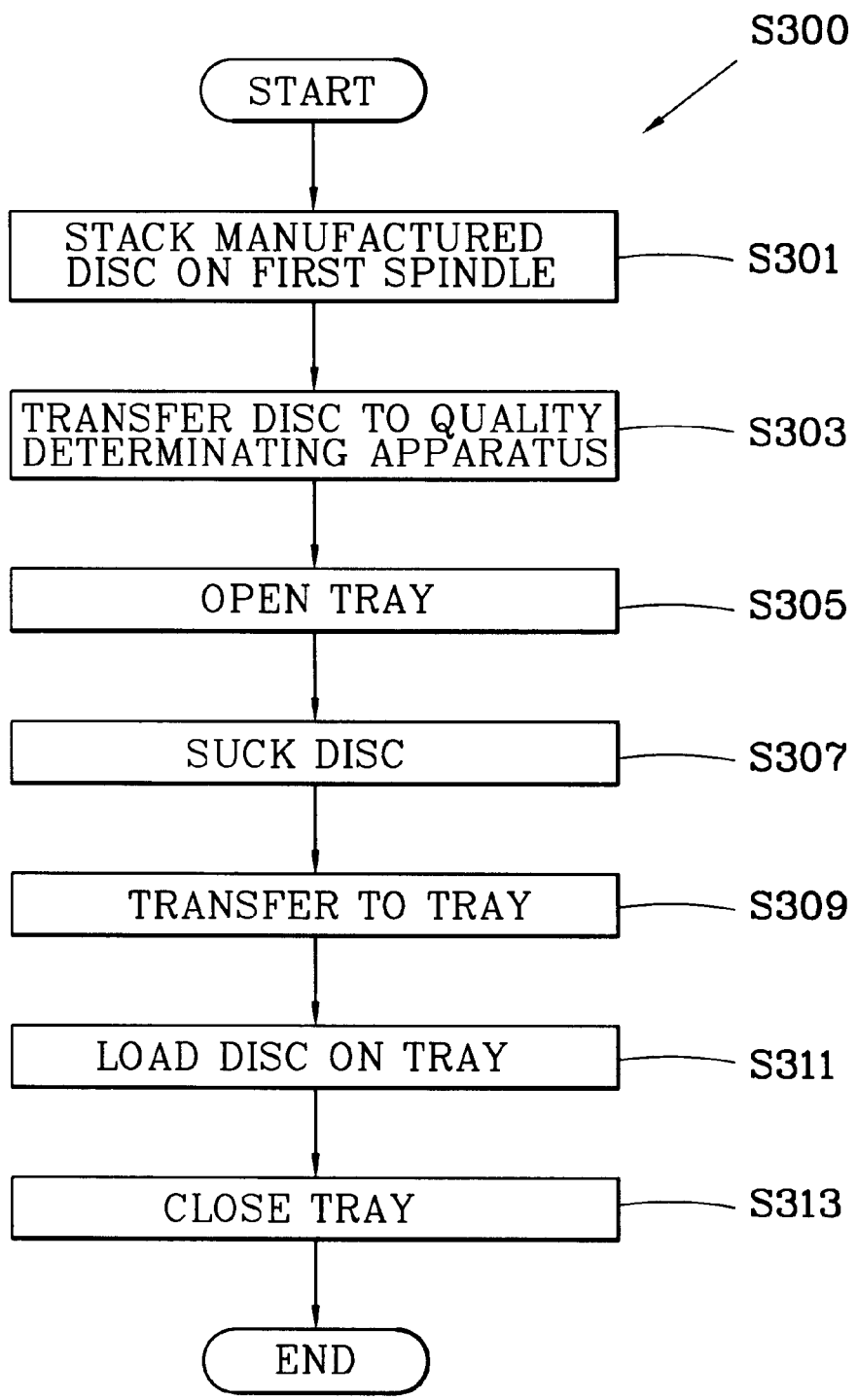
FIG. 20 illustrates a flow chart of the moving and loading steps in the flow chart of FIG. 19.

FIG. 19 illustrates a flow chart of the alternative optical disk quality inspection method according to the present invention. As shown, in step S300 an optical disk having been processed up to the point of forming the protection layer thereon is transferred from the first spindle 122 to one of the drives a–h. FIG. 20 illustrates a flow chart of step S300 in greater detail.

As shown in FIG. 20, optical disks with the protection layer formed thereon, but preferably not the coating layer, are stacked on the first spindle 122 in step S301. Optionally, step S301 is performed near the processing equipment, and the first spindle 122 is not mounted to the disk mounting unit 120 at this time. Thus, in step S303, the first spindle 122 is transferred to and mounted on the disk mounting unit 120. However, in step S301 the disks can be mounted on a first spindle 122, which is already mounted on the disk mounting unit 120; thus, eliminating step S303. The controller 120*a* then instructs one of the drives a–h to open its tray in step S305, and controls the disk transfer member 121 to pick-up a disk on the first spindle 122 using the pick-up 121*b*, in the manner discussed previously in step S307.

Next, in step S309, the disk transfer member 121 moves the optical disk picked up in step S307 above the tray opened in step S305. Suction on the disk is then released in step S311 to load the disk in the open tray. The open tray is then closed in step S313. Alternatively, steps S305, S307, S309 and S311 are performed in the order of S307, S309, S305, and S311.

Figure 21:
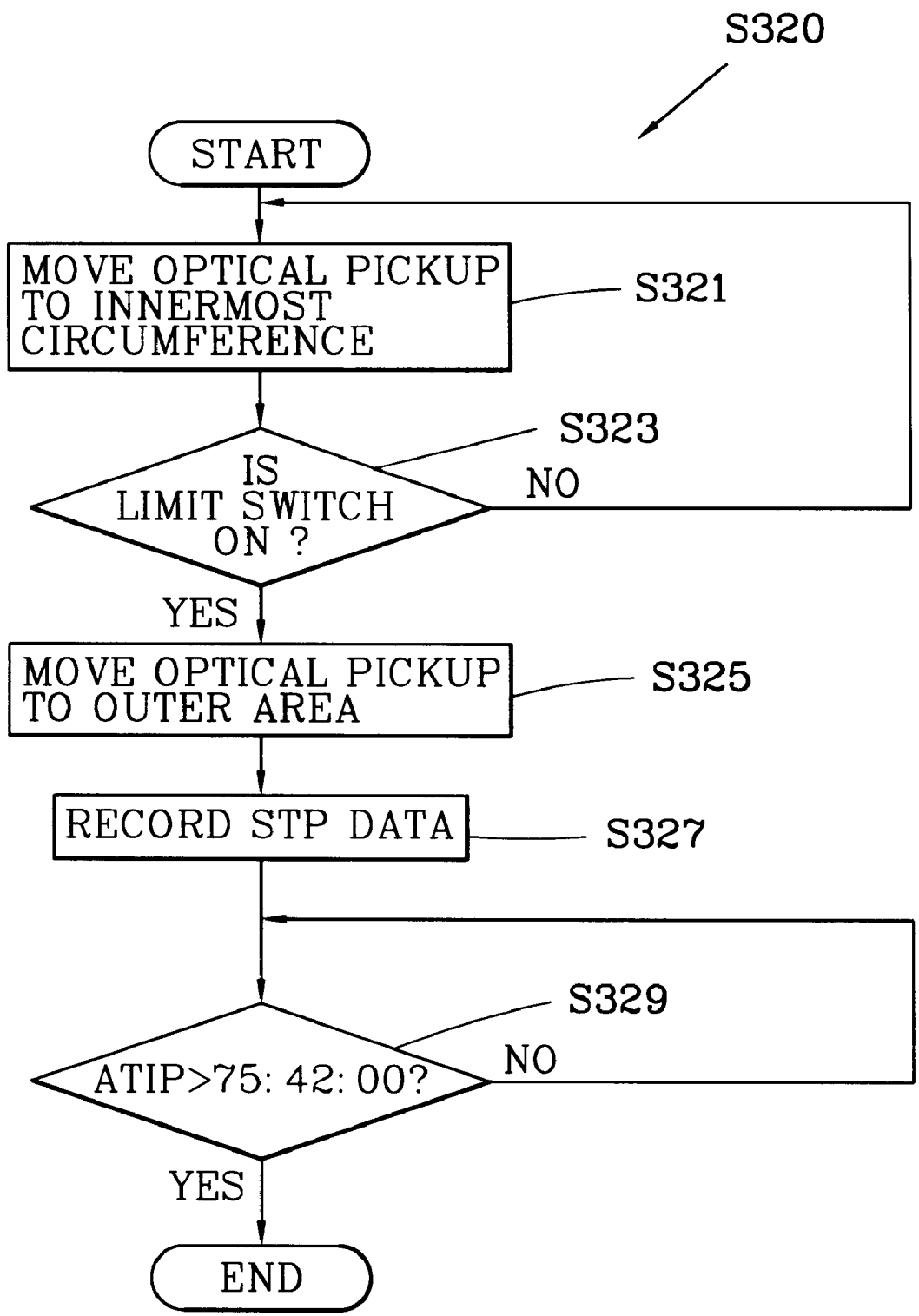
FIG. 21 illustrates a flow chart of the test data recording step in FIG. 19.

Returning to FIG. 19, the method continues by recording the test data STP on the optical disk loaded into a drive a–h in step S300. FIG. 21 illustrates the recording test data STP step S320 in greater detail.

As shown in FIG. 21, in step S321, the controller 120a instructs the microprocessor 139 to cause the servo control apparatus 134 to move the optical pick-up 131 into focus, and to move the optical pick-up 131 to an inner most circumference of the optical disk. When the optical pick-up 131 has reached the inner most circumference, this state is recognized by contact with a limit switch (not shown). Namely, as shown in step S323, the microprocessor 139 determines whether or not the limit switch is on. If the limit switch is not on, the microprocessor 139 continues to output instructions to move the optical pick-up 131 towards the inner most circumference of the optical disk. However, once the microprocessor 139 detects that the limit switch is on, then in step S325, the microprocessor 139 will begin moving the optical pick-up 131 to an outer area of the optical disk upon receipt of an instruction from the controller 120a. More specifically, the microprocessor 139 moves the optical pick-up 131 to ATIP 75:32:00.

In step S325 the optical pick-up has been placed at the start point of the STP area 151 shown in FIG. 17, and, under the control of the controller 120a, the microprocessor 139 causes the test data STP to be recorded in the STP area 151 of the optical disk in step S327. Namely, in a preferred embodiment, ASCII code 242 is repeatedly recorded in the STP area 151 of the optical disk.

During the recording of test data STP, the ATIP is detected and it is determined in step S329 whether the ATIP exceeds 75:42:00. If the ATIP does not exceed 75:42:00, then the recording of test data STP continues. However, if the ATIP does exceed 75:42:00, then the recording of test data STP ends.

Figure 22:
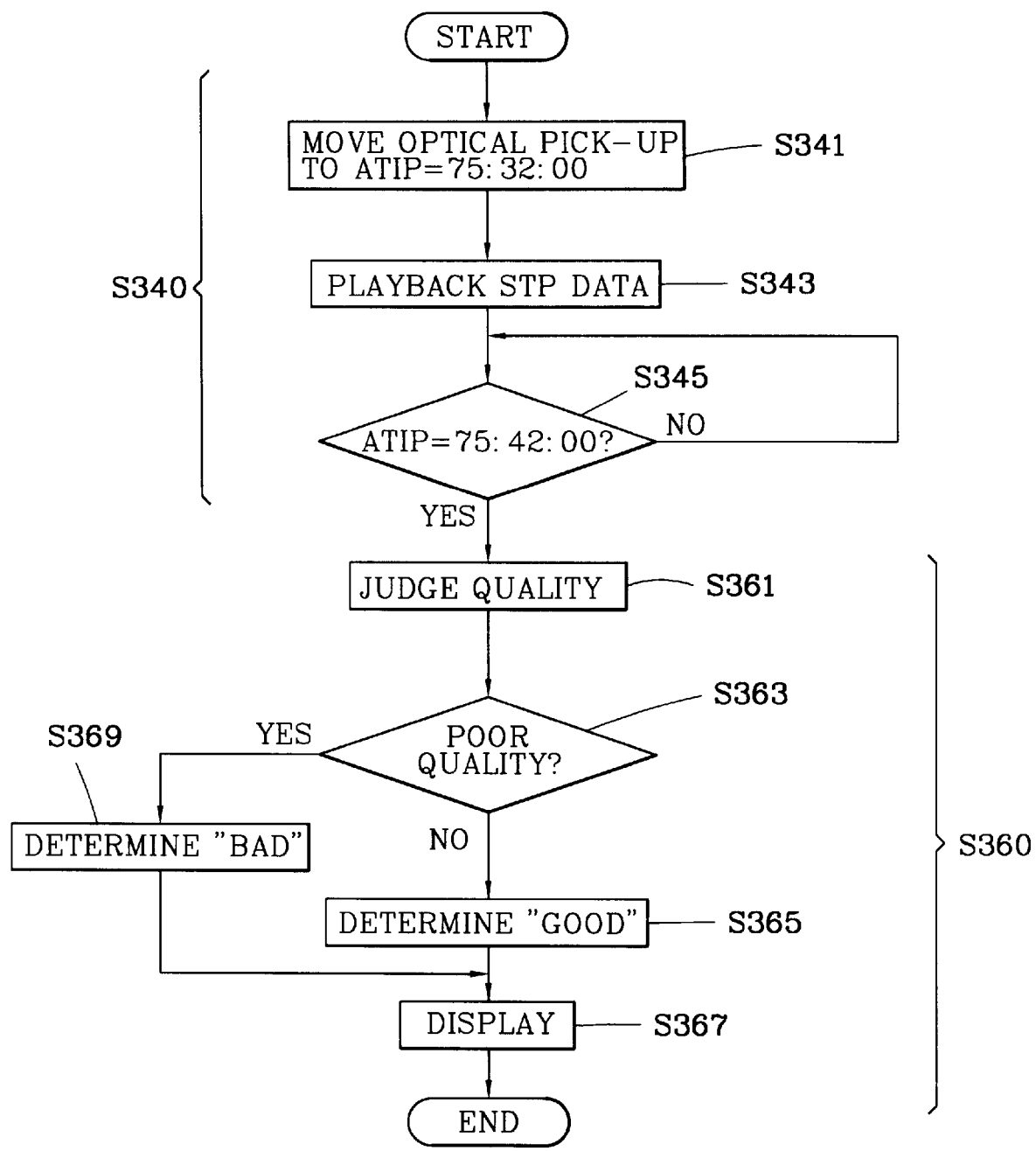
FIG. 22 illustrates a flow chart of the test data playingback step in FIG. 19.

Returning to FIG. 19, the recorded test data STP is then played back in step S340, and the quality of the optical disk is determined based on the played-back test data STP in step S360. FIG. 22 illustrates steps S340 and S360 in greater detail.

As shown in FIG. 22, in step S341, the microprocessor 139 moves the optical pick-up to ATIP 75:32:00. Then, in step S343 the test data STP is played-back. Specifically, the reproduced test data STP is amplified by the high frequency amplifier 137, and demodulated and error corrected in the DSP 138. This processed test data STP is then transmitted through the interface 140 to the controller 120a.

During this playback process, the ATIP is detected and it is determined in step S345 whether the ATIP equals 75:42:00. If the ATIP does not equal 75:42:00, then the playback of test data STP continues. However, once the ATIP equals 75:42:00, reproduction of the test data STP ends.

Processing then proceeds to step S361 wherein the controller 120a judges the quality of the optical disk based on the reproduced test data STP. Besides the controller 120a, this quality determination could be made by the microprocessor 139 or the computer 126. This quality judgement step is performed in the same manner as discussed above with respect to step S260 in FIG. 9; and therefore, a description of this step will not be repeated.

Once the quality is judged, the controller 120a determines in step S363 whether the optical disk was judged to be of poor quality. If so, in step S369, the optical disk is determined as bad. If, however, the optical disk was not judged of poor quality, then in step S365, the controller 120a classifies the optical disk as good. Next, in step S367 the controller 120a displays the determined quality of the optical disk on the indicator 120b.

Figure 23:
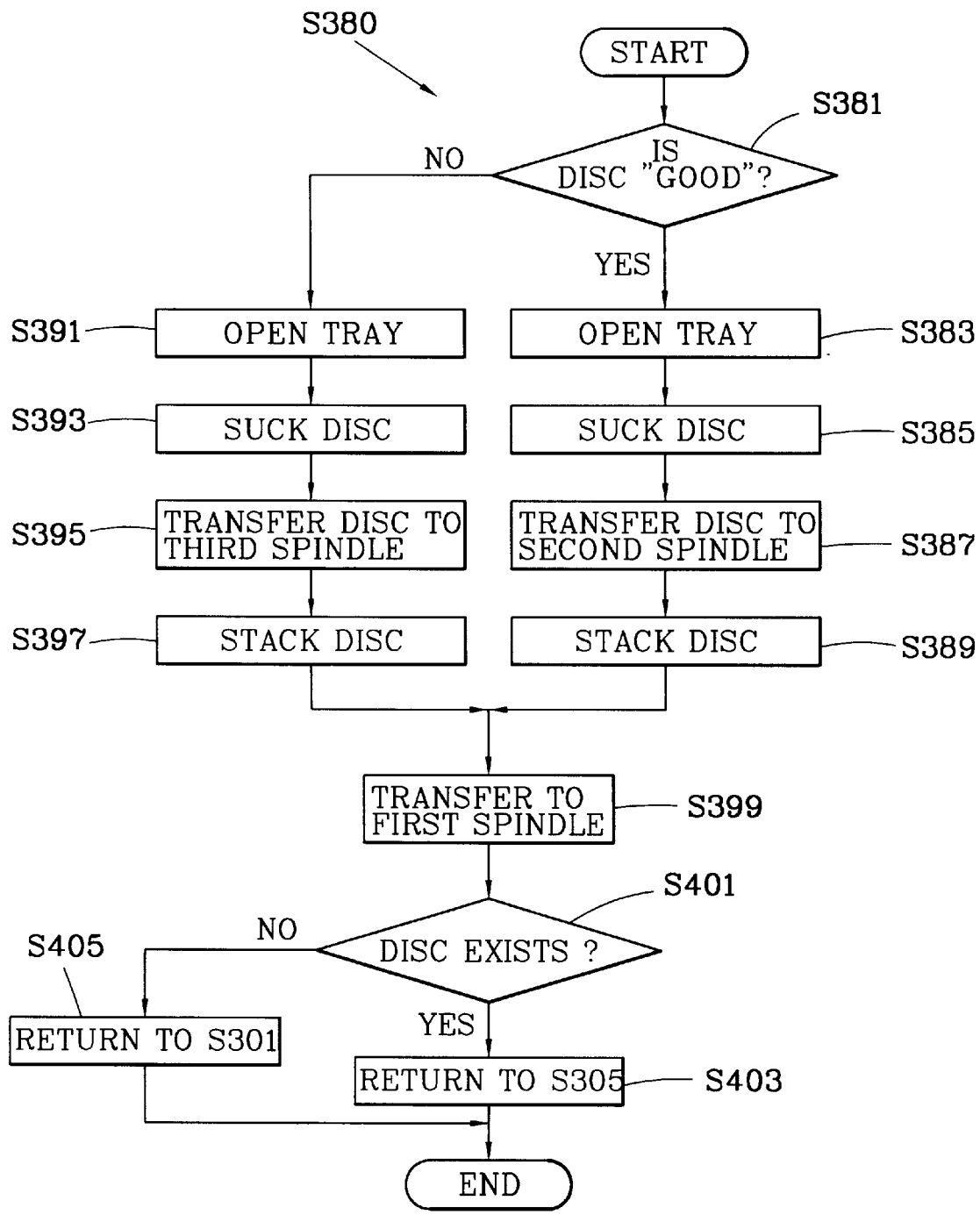
FIG. 23 illustrates a flow chart of the optical disk classifying step in FIG. 19.

Returning to FIG. 19, after performing step S360, the tested optical disk is then classified in step S380. FIG. 23 illustrates step S380 in greater detail. As shown in FIG. 23, in step S381, the controller 120a identifies whether the disk has been determined as good.

If good, the controller 120a causes the drive storing the optical disk to open its tray in step S383. Next, the controller 120a causes the disk transfer member 121 to pick-up the optical disk in the open tray in step S385, and move the disk above the second spindle 123 in step S387. In step S389, the controller 120a causes the disk transfer member 121 to release suction on the optical disk so that the optical disk is stacked on the second spindle 123. Processing then proceeds to step S399.

In step S381, if the optical disk is not identified as good, then in step S391 the controller 120a causes the drive a–h storing the optical disk to open its tray, and in step S393 controls the disk transfer member 121 to pick-up the optical disk. Then, in step S395, the controller 120a causes the disk transfer member 121 to position the optical disk above the third spindle 124. In step S397, the controller 120a causes the disk transfer member 121 to release suction on the optical disk such that the optical disk is stacked on the third spindle 124. Processing then proceeds to step S399.

In step S399, the controller 120a returns the disk transfer member 121 to the first spindle 122. At this point, it is determined whether any disks exist on the first spindle 122. Namely, in step S399 the controller 120a causes the pick-up 121b to move vertically downward over the first spindle 122. If the pick-up 121b reaches a minimum vertically position before the touch sensor 121c is triggered, then the controller 120a determines that no optical disks exist on the first spindle 122. Otherwise, the controller 120a determines that an optical disk does exist on the first spindle 122. If a disk exists on the first spindle 122, then in step S403, processing returns to step S305 in FIG. 20. If, however, no more disks exist on the first spindle 122, then in step S405, processing returns to step S301.

The above-described alternative limitation is not limited to the second embodiment of the present invention. Instead, one skilled in the art will readily appreciate that the third embodiment can employ this method as well.

The method and apparatus for testing the quality of an optical disk according to the present invention record and reproduce test data from an outer area of the optical disk. This area is not used in either prerecorded optical disks or write-once optical disks. Therefore, each disk manufactured can have its quality tested according to the present invention without rendering that optical disk useless as a commercial product. As a result, the quality testing according to the present invention is much more accurate and reliable. Namely, every disk can be quality tested; however, optionally, only a sample of disks can still be tested.

The disk quality inspection according to the present invention is not confined to a disk processed to the point where a protection layer is formed thereon, but it is also applicable to a disk processed up to the formation of a recording layer, a reflection layer or a labeling layer. Further, the present invention allows the quality inspection to be executed after the conventional sampling inspection or a visual inspection.

As described above, the present invention enables the combination of automatic disk quality inspection and disk fabrication processes.

Still further, in the present invention, the test data STP are recorded/playedback on/from the outer area of the optical disk in a short period of time; thereby decreasing production cost of write-once disks.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for testing quality of an optical disk medium, comprising:

reproducing test data in an outer area of said optical disk medium to produce a test signal, said outer area of said optical disk medium being located circumferentially outside of a main information storage area;

judging quality of said optical disk medium based on said reproduced test signal; and transferring said optical disk medium to one of at least two spindles based on said judged quality, each spindle corresponding to a class of quality.

2. The method of claim 1, wherein said reproducing step comprises:

detecting an absolute time in pre-groove (ATIP) at a location of an optical pick-up, said optical pick-up for reproducing data from said optical disk medium;

determining if said detected ATIP equals a predetermined ATIP;

moving said optical pick-up towards said predetermined ATIP if said determining step indicates that said detected ATIP does not equal said predetermined ATIP; and beginning reproduction of said test data when said determining step indicates said detected ATIP equals said predetermined ATIP.

3. The method of claim 1, said reproducing step comprises:

beginning reproduction of said test data at a first predetermined absolute time in pre-groove (ATIP);

detecting an ATIP at a location of an optical pick-up, said optical pick-up reproducing said test data from said optical disk medium;

determining if said detected ATIP equals a second predetermined ATIP; and halting reproduction of said test data when said determining step indicates said detected ATIP equals said second predetermined ATIP.

4. The method of claim 1, wherein said transferring step comprises:

transferring said optical disk medium to a first spindle when said judged quality is good; and transferring said optical disk medium to a second spindle when said judged quality is bad.

5. The method of claim 1, wherein said test data includes at least one of ASCII codes, audio data, and null data.

6. The method of claim 5, wherein said test data is ASCII code 242.

7. The method of claim 1, further comprising:

displaying said judged quality on a display.

8. A method for recording a test signal in an optical disk medium, comprising:

disposing an optical disk medium in a data recording location;

positioning an optical pick-up at an outer area of said optical disk medium, said outer area of said optical disk medium being located circumferentially outside of a main information storage area, said positioning step including, detecting a first absolute time in pre-groove (ATIP) at a location of said optical pick-up, determining if said detected first ATIP equals a first predetermined ATIP, moving said optical pick-up towards said predetermined ATIP if said determining step indicates that said detected ATIP does not equal said predetermined ATIP; and recording test data in said outer area using said optical pick-up.

9. The method of claim 8, wherein said disposing step comprises:

transferring an optical disk medium from a spindle to said data recording location.

10. The method of claim 9, further comprising:

loading optical disk media on said spindle.

11. The method of claim 10, wherein said loading step loads optical disk media, between fabrication processing steps, on said spindle.

12. The method of claim 10, further comprising:

mounting said spindle on a transferring unit; and wherein said transferring step is performed by said transferring unit.

13. The method of claim 9, wherein said transferring step is performed by a transferring unit.

14. The method of claim 8, wherein said disposing step disposes an optical disk medium, between fabrication processing steps, at said data recording location.

15. The method of claim 8, wherein said recording step comprises:

beginning recording of said test data at a second predetermined ATIP;

detecting a second ATIP at a location of said optical pick-up;

determining if said detected second ATIP equals a third predetermined ATIP; and halting recording of said test data when said determining step indicates said detected second ATIP equals said third predetermined ATIP.

16. The method of claim 8, wherein said test data includes at least one of ASCII codes, audio data, and null data.

17. The method of claim 16, wherein said test data is ASCII code 242.

18. An apparatus for testing quality of an optical disk medium, comprising:

at least first and second spindles;

a disk transfer member for transferring optical disk media;

an optical pick-up; and control means for controlling said optical pick-up to reproduce test data in an outer area of said optical disk medium to produce a test signal, said outer area of said optical disk medium being located circumferentially outside of a main information storage area, for judging quality of said optical disk medium based on said reproduced test signal, and for controlling said disk transfer member to transfer said optical disk medium to one of said first and second spindles based on said judged quality.

19. The apparatus of claim 18, wherein said control means detects, via said optical pick-up, an absolute time in pre-groove (ATIP) at a location of said optical pick-up; determines if said detected ATIP equals a predetermined ATIP; moves said optical pick-up towards said predetermined ATIP if said detected ATIP does not equal said predetermined ATIP; and begins reproduction of said test data via said optical pick-up when said detected ATIP equals said predetermined ATIP.

20. The apparatus of claim 18, said control means begins reproduction of said test data, via said optical pick-up, at a first predetermined absolute time in pre-groove (ATIP); detects an ATIP, via said optical pick-up, at a location of said optical pick-up; determines if said detected ATIP equals a second predetermined ATIP; and halts reproduction of said test data when said detected ATIP equals said second predetermined ATIP.

21. The apparatus of claim 18, wherein said control means controls said disk transferring member to transfer said optical disk medium to said first spindle when said judged quality is good, and to transfer said optical disk medium to said second spindle when said judged quality is bad.

22. The apparatus of claim 18, wherein said test data includes at least one of ASCII codes, audio data, and null data.

23. The apparatus of claim 22, wherein said test data is ASCII code 242.

24. The apparatus of claim 18, further comprising:
a display displaying said judged quality.

25. An apparatus for recording a test signal in an optical disk medium, comprising:
a disk transfer member for transferring optical disk media;
an optical pick-up; and
control means for controlling said disk transfer member to dispose an optical disk medium at a data recording location, for positioning said optical pick-up at an outer area of said optical disk medium, said outer area of said optical disk medium being located circumferentially outside of a main information storage area, and for recording test data in said outer area using said optical pick-up, and wherein said control means, in positioning said optical pick-up, detects, via said optical pick-up, a first absolute time in pre-groove (ATIP) at a location of said optical pick-up; determines if said detected first ATIP equals a first predetermined ATIP; and moves said optical pick-up towards said first predetermined ATIP if said detected first ATIP does not equal said first predetermined ATIP.

26. The apparatus of claim 28, further comprising:
a spindle holding optical disk media; and wherein
said control means controls said disk transfer member to transfer said optical disk medium from said spindle to said data recording location.

27. The apparatus of claim 26, wherein said spindle holds optical disk media between fabrication processing steps.

28. The apparatus of claim 25, wherein said control means controls said disk transfer member to dispose an optical disk medium, between fabrication processing steps, in said data recording location.

29. The apparatus of claim 25, wherein said control means, in recording said test data, controls said optical pick-up to begins recording said test data at a second predetermined ATIP; detects, via said optical pick-up, a second ATIP at a location of said optical pick-up; determines if said detected second ATIP equals a third predetermined ATIP; and stops recording said test data when said detected second ATIP equals said third predetermined ATIP.

30. The apparatus of claim 25, wherein said test data includes at least one of ASCII codes, audio data, and null data.

31. The apparatus of claim 30, wherein said test data is ASCII code 242.

32. A method for recording a test signal in an optical disk medium, comprising:
disposing an optical disk medium in a data recording location;
positioning an optical pick-up at an outer area of said optical disk medium, said outer area of said optical disk medium being located circumferentially outside of a main information storage area; and
recording test data in said outer area using said optical pick-up, said recording step including,
beginning recording of said test data at a first predetermined absolute time in pre-groove (ATIP),
detecting an ATIP at a location of said optical pickup,
determining if said detected ATIP equals a second predetermined ATIP, and
halting recording of said test data when said determining step indicates said detected ATIP equals said second predetermined ATIP.

33. A method for recording a test signal in an optical disk medium, comprising:
disposing an optical disk medium in a data recording location;
positioning an optical pick-up at an outer area of said optical disk medium, said outer area of said optical disk medium being located circumferentially outside of a main information storage area; and
recording test data in said outer area using said optical pick-up, said test data including ASCII code 242.

34. An apparatus for recording a test signal in an optical disk medium, comprising:
a disk transfer member for transferring optical disk media;
an optical pick-up; and
control means for controlling said disk transfer member to dispose an optical disk medium at a data recording location, for positioning said optical pick-up at an outer area of said optical disk medium, said outer area of said optical disk medium being located circumferentially outside of a main information storage area, and for recording test data in said outer area using said optical pick-up, and wherein said control means, in recording said test data, controls said optical pick-up to begins recording said test data at a first predetermined absolute time in pre-groove (ATIP); detects, via said optical pick-up, an ATIP at a location of said optical pick-up; determines if said detected ATIP equals a second predetermined ATIP; and stops recording said test data when said detected ATIP equals said second predetermined ATIP.

35. An apparatus for recording a test signal in an optical disk medium, comprising:
a disk transfer member for transferring optical disk media;
an optical pick-up; and control means for controlling said disk transfer member to dispose an optical disk medium at a data recording location, for positioning said optical pick-up at an outer area of said optical disk medium, said outer area of said optical disk medium being located circumferentially outside of a main information storage area, and for recording test data in said outer area using said optical pick-up, said test data including ASCII code 242.

* * * * *